(12) United States Patent
Kohn et al.

(10) Patent No.: US 11,069,926 B1
(45) Date of Patent: Jul. 20, 2021

(54) CONTROLLING ONGOING BATTERY SYSTEM USAGE VIA PARAMETRIC LINEAR APPROXIMATION

(71) Applicant: Veritone Alpha, Inc., Costa Mesa, CA (US)

(72) Inventors: Wolf Kohn, Seattle, WA (US); Yanfang Shen, Bellevue, WA (US)

(73) Assignee: Veritone Alpha, Inc., Costa Mesa, CA (US)

( * ) Notice: Subject to any disclaimer, the term of this patent is extended or adjusted under 35 U.S.C. 154(b) by 324 days.

(21) Appl. No.: 16/276,545

(22) Filed: Feb. 14, 2019

(51) Int. Cl.
| | |
|---|---|
| *H01M 10/42* | (2006.01) |
| *H01M 10/05* | (2010.01) |
| *H02J 7/04* | (2006.01) |
| *B60L 58/10* | (2019.01) |
| *H01M 10/0525* | (2010.01) |
| *H02J 7/00* | (2006.01) |

(52) U.S. Cl.
CPC ......... *H01M 10/4257* (2013.01); *B60L 58/10* (2019.02); *H01M 10/0525* (2013.01); *H02J 7/007192* (2020.01); *H02J 7/045* (2013.01)

(58) Field of Classification Search
CPC ........... H01M 10/4257; H01M 10/0525; H02J 7/007192; H02J 7/045; B60L 58/10
USPC ....................................................... 320/151
See application file for complete search history.

(56) References Cited

U.S. PATENT DOCUMENTS

| | | | |
|---|---|---|---|
| 5,724,239 A | 3/1998 | Kaneko | |
| 5,727,128 A | 3/1998 | Morrison | |
| 5,755,378 A | 5/1998 | Dage | |
| 5,963,447 A * | 10/1999 | Kohn | G05B 19/41865 |
| | | | 700/49 |

(Continued)

FOREIGN PATENT DOCUMENTS

| | | | | |
|---|---|---|---|---|
| FR | 2889314 A1 * | 2/2007 | ......... | G01R 31/3842 |
| GB | 2535306 A * | 8/2016 | ................ | H02J 7/02 |

(Continued)

OTHER PUBLICATIONS

Ge et al., "Hybrid Systems: Chattering Approximation to Relaxed Controls,"*Lecture Notes in Computer Science vol. 1066: Hybrid Systems III*, 1996, 25 pages.

(Continued)

*Primary Examiner* — John T Trischler
(74) *Attorney, Agent, or Firm* — VLP Law Group LLP; James A. D. White

(57) ABSTRACT

An automated control system to control at least some operations of one or more target physical systems that each includes one or more batteries. The described techniques may include determining whether and how much power to supply for each of a series of time periods, and implementing the determined power amount for a time period by determining and setting one of multiple impedance level control values of an associated actuator component. Repeated automated operations of this type may include using parametric linear approximation to determine one of multiple enumerated control values that best satisfies one or (Continued)

more defined goals at a given time in light of current state information (e.g., current output from the battery, voltage from the battery, battery temperature, etc.), such as by repeatedly determining an improved distribution function over the control values, and propagating it over multiple future time periods.

22 Claims, 16 Drawing Sheets

(56) References Cited

U.S. PATENT DOCUMENTS

| | | | | |
|---|---|---|---|---|
| 6,088,689 | A * | 7/2000 | Kohn | G05B 13/0265 706/10 |
| 6,317,837 | B1 * | 11/2001 | Kenworthy | H04L 63/0209 726/11 |
| 6,687,558 | B2 * | 2/2004 | Tuszynski | G06F 30/00 700/97 |
| 6,694,044 | B1 * | 2/2004 | Pavlovic | G05B 17/02 342/95 |
| 6,760,631 | B1 * | 7/2004 | Berkowitz | G05B 13/024 318/561 |
| 6,944,317 | B2 * | 9/2005 | Pavlovic | G05B 17/02 348/154 |
| 7,072,723 | B2 | 7/2006 | Kohn et al. | |
| 7,072,808 | B2 * | 7/2006 | Tuszynski | G05B 15/02 703/2 |
| 7,187,992 | B2 * | 3/2007 | Tuszynski | G05B 15/02 700/97 |
| 7,213,009 | B2 * | 5/2007 | Pestotnik | G16H 20/00 706/46 |
| 7,216,004 | B2 | 5/2007 | Kohn et al. | |
| 7,242,989 | B2 * | 7/2007 | Blevins | G05B 13/027 700/29 |
| 7,321,848 | B2 * | 1/2008 | Tuszynski | G05B 15/02 703/2 |
| 7,358,704 | B2 * | 4/2008 | Yumoto | H01M 10/48 320/132 |
| 7,433,809 | B1 * | 10/2008 | Guirguis | G06F 17/11 703/2 |
| 7,483,849 | B2 * | 1/2009 | Voudrie | G06Q 40/00 705/30 |
| 7,525,285 | B2 * | 4/2009 | Plett | H02J 7/0014 320/132 |
| 7,565,333 | B2 * | 7/2009 | Grichnik | G05B 17/02 706/12 |
| 7,574,383 | B1 | 8/2009 | Parasnis et al. | |
| 7,664,750 | B2 * | 2/2010 | Frees | G06Q 10/109 707/608 |
| 7,737,665 | B2 * | 6/2010 | Grewe | H02J 7/0029 320/150 |
| 7,739,172 | B2 * | 6/2010 | Voudrie | G06Q 40/04 705/36 R |
| 7,739,183 | B2 * | 6/2010 | Voudrie | G06Q 40/12 705/37 |
| 7,739,302 | B2 * | 6/2010 | Kenworthy | H04L 63/0209 707/783 |
| 7,764,049 | B2 * | 7/2010 | Iwane | G01R 31/367 320/136 |
| 7,774,179 | B2 * | 8/2010 | Guirguis | G06F 17/11 703/2 |
| 7,917,234 | B2 * | 3/2011 | Tuszynski | G06F 30/00 700/33 |
| 7,952,323 | B2 * | 5/2011 | Lamothe | H02J 7/025 320/108 |
| 7,974,826 | B2 * | 7/2011 | Davari | G06F 30/00 703/18 |
| 7,994,755 | B2 * | 8/2011 | Plett | G01R 31/367 320/132 |
| 8,261,283 | B2 | 9/2012 | Tsafrir et al. | |
| 8,280,845 | B2 * | 10/2012 | Frees | G06Q 10/10 707/608 |
| 8,306,994 | B2 * | 11/2012 | Kenworthy | G06F 16/951 707/769 |
| 8,429,106 | B2 | 4/2013 | Downs et al. | |
| 8,519,675 | B2 * | 8/2013 | Plett | G01R 31/367 320/132 |
| 8,538,901 | B2 * | 9/2013 | Prokhorov | G06N 5/00 706/23 |
| 8,558,712 | B2 * | 10/2013 | Fechalos | H01M 10/482 340/664 |
| 8,560,070 | B2 * | 10/2013 | Armstrong | A61N 1/378 607/29 |
| 8,606,788 | B2 | 12/2013 | Chen et al. | |
| 8,751,432 | B2 * | 6/2014 | Berg-Sonne | G05B 15/02 706/48 |
| 8,768,500 | B2 * | 7/2014 | Tuszynski | G05B 19/41865 700/108 |
| 8,768,882 | B2 * | 7/2014 | Frees | G06Q 10/109 707/608 |
| 8,816,627 | B2 * | 8/2014 | Wang | B25J 9/1664 318/565 |
| 8,849,771 | B2 * | 9/2014 | Berg-Sonne | G05B 15/02 707/687 |
| 8,855,829 | B2 * | 10/2014 | Golden | H04L 67/10 700/291 |
| 8,874,277 | B2 * | 10/2014 | Kouroussis | G05B 15/02 700/295 |
| 8,892,600 | B2 * | 11/2014 | Kenworthy | H04L 63/0218 707/783 |
| 8,935,043 | B2 * | 1/2015 | Li | B60L 3/12 701/34.4 |
| 8,949,772 | B1 | 2/2015 | Talby et al. | |
| 8,975,866 | B2 * | 3/2015 | McGrath | B60L 53/54 320/109 |
| 9,000,732 | B2 * | 4/2015 | Kim | G01R 31/392 320/162 |
| 9,093,840 | B2 * | 7/2015 | Sun | G05B 15/02 |
| 9,156,467 | B2 * | 10/2015 | Tani | H02J 7/14 |
| 9,197,078 | B2 * | 11/2015 | Lee | B60L 58/15 |
| 9,217,416 | B2 * | 12/2015 | Spruce | F03D 7/0272 |
| 9,257,868 | B2 * | 2/2016 | Chuah | H02J 9/066 |
| 9,272,634 | B2 * | 3/2016 | Li | B60W 10/26 |
| 9,312,722 | B2 * | 4/2016 | Lee | H02J 7/007 |
| 9,335,748 | B2 * | 5/2016 | Francino | H02J 3/14 |
| 9,377,512 | B2 * | 6/2016 | Frost | B60L 50/66 |
| 9,400,491 | B2 * | 7/2016 | Kolinsky | G05B 13/04 |
| 9,404,426 | B2 * | 8/2016 | Wichmann | F01D 21/003 |
| 9,448,577 | B2 * | 9/2016 | Kouroussis | G05B 15/02 |
| 9,457,686 | B2 * | 10/2016 | Chang | H02J 7/1461 |
| 9,496,748 | B2 * | 11/2016 | Chuah | H02J 7/04 |
| 9,539,912 | B2 * | 1/2017 | Li | B60L 50/61 |
| 9,581,981 | B2 * | 2/2017 | Kniazev | G06F 17/11 |
| 9,607,264 | B2 * | 3/2017 | Downs | G06N 3/08 |
| 9,625,533 | B2 * | 4/2017 | Le | G01R 31/367 |
| 9,718,455 | B2 * | 8/2017 | Yu | B60W 10/06 |
| 9,721,312 | B2 * | 8/2017 | Goldsmith | G06Q 50/06 |
| 9,846,839 | B2 * | 12/2017 | Nasle | G06N 5/048 |
| 9,859,739 | B2 * | 1/2018 | Harrant | H02P 23/0004 |
| 9,869,724 | B2 * | 1/2018 | Kimura | G01R 31/389 |
| 9,942,313 | B2 * | 4/2018 | Archer | H04L 41/145 |
| 9,946,517 | B2 | 4/2018 | Talby et al. | |
| 9,957,843 | B2 * | 5/2018 | Wichmann | G05B 13/04 |
| 9,960,625 | B2 * | 5/2018 | Klein | H01M 10/48 |
| 9,989,595 | B1 * | 6/2018 | Wang | G01R 31/382 |
| 10,023,064 | B2 * | 7/2018 | Lee | B60L 53/665 |
| 10,063,066 | B2 * | 8/2018 | Zane | H02J 7/0068 |
| 10,074,878 | B2 * | 9/2018 | Ishishita | H01M 10/443 |
| 10,082,778 | B2 * | 9/2018 | Kohn | G05B 19/048 |
| 10,088,529 | B2 * | 10/2018 | Joe | G01R 31/367 |
| 10,107,865 | B2 * | 10/2018 | Choi | G01R 31/367 |
| 10,128,655 | B2 * | 11/2018 | Sun | G05B 15/02 |
| 10,132,869 | B2 * | 11/2018 | Joe | G01R 31/389 |
| 10,133,250 | B2 * | 11/2018 | Kohn | G05B 13/041 |
| 10,170,911 | B1 * | 1/2019 | Sandoval | H03L 7/08 |
| 10,178,447 | B2 * | 1/2019 | Schwartz | H04Q 9/00 |
| 10,186,123 | B2 * | 1/2019 | Kanaujia | G08B 13/19645 |
| 10,186,866 | B2 * | 1/2019 | Kouroussis | H02J 3/1892 |
| 10,243,385 | B2 * | 3/2019 | MirTabatabaei | B60L 3/12 |
| 10,261,134 | B2 * | 4/2019 | Joe | G01R 31/36 |

(56) References Cited

U.S. PATENT DOCUMENTS

| | | | |
|---|---|---|---|
| 10,263,447 B2* | 4/2019 | MirTabatabaei | G01R 31/382 |
| 10,277,041 B2* | 4/2019 | Zane | H02J 7/00 |
| 10,282,687 B2* | 5/2019 | Parvania | G06Q 10/06312 |
| 10,282,796 B2* | 5/2019 | ElBsat | G06Q 30/0284 |
| 10,288,691 B2* | 5/2019 | Lee | G01R 31/3648 |
| 10,296,030 B2* | 5/2019 | Parvania | H02J 3/00 |
| 10,298,026 B2* | 5/2019 | Trimboli | H02J 1/102 |
| 10,303,131 B2* | 5/2019 | Kohn | F24F 11/62 |
| 10,379,171 B2* | 8/2019 | Heiries | G01R 31/007 |
| 10,447,054 B2* | 10/2019 | Christensen | G01R 31/392 |
| 10,452,045 B1* | 10/2019 | Kohn | G05B 19/042 |
| 10,491,022 B2* | 11/2019 | MirTabatabaei | G01R 31/392 |
| 10,503,128 B2* | 12/2019 | Pekar | F02D 29/02 |
| 10,509,374 B2* | 12/2019 | Parvania | G05F 1/66 |
| 10,520,905 B2* | 12/2019 | Cross | G05B 13/048 |
| 10,527,677 B2* | 1/2020 | Kawai | G01R 31/367 |
| 10,530,156 B2* | 1/2020 | Kouroussis | G05F 1/66 |
| 10,530,290 B2* | 1/2020 | Janik | F02D 41/1405 |
| 10,538,174 B2* | 1/2020 | Sun | B60L 3/12 |
| 10,601,316 B2* | 3/2020 | Kohn | H02J 7/0063 |
| 10,666,076 B1* | 5/2020 | Kohn | G01R 31/367 |
| 10,686,321 B2* | 6/2020 | Ravi | H02J 7/0072 |
| 10,816,949 B1* | 10/2020 | Kohn | G05B 19/056 |
| 10,909,642 B2* | 2/2021 | ElBsat | G05B 13/026 |
| 10,969,757 B1* | 4/2021 | Kohn | G05B 17/02 |
| 2002/0049899 A1 | 4/2002 | Kenworthy | |
| 2002/0120906 A1* | 8/2002 | Xia | H01M 8/04992 716/111 |
| 2003/0069868 A1 | 4/2003 | Vos | |
| 2003/0149501 A1* | 8/2003 | Tuszynski | G05B 19/41865 700/97 |
| 2003/0176938 A1* | 9/2003 | Tuszynski | G05B 19/41865 700/97 |
| 2003/0234812 A1 | 12/2003 | Drucker et al. | |
| 2004/0004462 A1* | 1/2004 | Bean | H02J 7/345 320/128 |
| 2004/0042639 A1* | 3/2004 | Pavlovic | G06K 9/00335 382/107 |
| 2004/0167648 A1* | 8/2004 | Tuszynski | G06F 30/00 700/97 |
| 2004/0243380 A1* | 12/2004 | Blevins | G05B 17/02 703/22 |
| 2004/0260666 A1 | 12/2004 | Pestotnik et al. | |
| 2005/0086230 A1* | 4/2005 | Frees | G06Q 10/10 |
| 2005/0102044 A1* | 5/2005 | Kohn | G05B 13/024 700/28 |
| 2005/0194976 A1* | 9/2005 | Yumoto | G01R 31/367 324/433 |
| 2005/0246149 A1* | 11/2005 | Tuszynski | G06F 30/00 703/2 |
| 2005/0273409 A1* | 12/2005 | Voudrie | G06Q 40/12 705/36 R |
| 2005/0273410 A1* | 12/2005 | Voudrie | G06Q 40/06 705/36 R |
| 2005/0273411 A1* | 12/2005 | Voudrie | G06Q 40/12 705/36 R |
| 2005/0273412 A1* | 12/2005 | Voudrie | G06Q 40/12 705/36 R |
| 2005/0273413 A1 | 12/2005 | Vaudrie | |
| 2006/0097698 A1* | 5/2006 | Plett | H02J 7/0014 320/118 |
| 2006/0173661 A1* | 8/2006 | Kohn | G06F 17/11 703/2 |
| 2006/0218074 A1 | 9/2006 | Kohn | |
| 2006/0229769 A1 | 10/2006 | Grichnik et al. | |
| 2006/0235783 A1* | 10/2006 | Ryles | G06Q 40/00 705/35 |
| 2007/0040449 A1* | 2/2007 | Spurlin | G06F 1/30 307/64 |
| 2007/0219657 A1* | 9/2007 | Tuszynski | G05B 19/41865 700/97 |
| 2008/0155550 A1* | 6/2008 | Tsafrir | G06F 9/4881 718/103 |
| 2008/0167756 A1 | 7/2008 | Golden et al. | |
| 2008/0212249 A1* | 9/2008 | Grewe | H02J 7/0029 361/103 |
| 2009/0027007 A1* | 1/2009 | Iwane | G01R 31/367 320/129 |
| 2009/0113049 A1 | 4/2009 | Nasle | |
| 2009/0189613 A1* | 7/2009 | Plett | G01R 31/3842 324/426 |
| 2010/0100594 A1* | 4/2010 | Frees | G06Q 10/10 709/205 |
| 2010/0153324 A1* | 6/2010 | Downs | G06F 40/258 706/21 |
| 2010/0242098 A1* | 9/2010 | Kenworthy | H04L 63/0218 726/4 |
| 2011/0035071 A1 | 2/2011 | Sun | |
| 2011/0178622 A1 | 7/2011 | Tuszynski | |
| 2011/0298626 A1 | 12/2011 | Fechalos et al. | |
| 2012/0010757 A1* | 1/2012 | Francino | H02J 3/14 700/291 |
| 2012/0068662 A1* | 3/2012 | Durando | H01M 50/20 320/105 |
| 2012/0072181 A1* | 3/2012 | Imani | G06F 30/23 703/1 |
| 2012/0109620 A1* | 5/2012 | Gaikwad | G05B 13/048 703/21 |
| 2012/0143356 A1 | 6/2012 | Berg-Sonne | |
| 2012/0143810 A1* | 6/2012 | Berg-Sonne | G05B 15/02 706/47 |
| 2012/0150788 A1* | 6/2012 | Berg-Sonne | G05B 15/02 706/48 |
| 2012/0256583 A1* | 10/2012 | Davis | H02J 7/345 320/103 |
| 2012/0274281 A1 | 11/2012 | Kim | |
| 2012/0283887 A1 | 11/2012 | Goldsmith et al. | |
| 2012/0323921 A1* | 12/2012 | Chen | G06F 16/313 707/740 |
| 2013/0061294 A1* | 3/2013 | Kenworthy | H04L 63/0209 726/4 |
| 2013/0080530 A1 | 3/2013 | Frees et al. | |
| 2013/0099576 A1 | 4/2013 | Chuah et al. | |
| 2013/0099720 A1* | 4/2013 | Chuah | H02J 9/066 320/101 |
| 2013/0119916 A1 | 5/2013 | Wang et al. | |
| 2013/0154577 A1* | 6/2013 | Iwane | H02J 7/0077 320/162 |
| 2013/0253942 A1 | 9/2013 | Liu et al. | |
| 2013/0274936 A1 | 10/2013 | Donahue et al. | |
| 2013/0282195 A1* | 10/2013 | O'Connor | F01K 13/02 700/291 |
| 2013/0304266 A1* | 11/2013 | Giannakis | G01R 21/133 700/286 |
| 2013/0325769 A1* | 12/2013 | Downs | G06N 7/005 706/18 |
| 2014/0114517 A1 | 4/2014 | Tani et al. | |
| 2014/0214268 A1* | 7/2014 | Li | B60L 3/12 701/34.4 |
| 2014/0217976 A1 | 8/2014 | McGrath | |
| 2014/0250377 A1 | 9/2014 | Bisca et al. | |
| 2014/0277600 A1* | 9/2014 | Kolinsky | G05B 13/042 700/29 |
| 2014/0278167 A1* | 9/2014 | Frost | G01R 31/3644 702/63 |
| 2014/0316728 A1* | 10/2014 | Zhong | G01R 31/367 702/63 |
| 2014/0333317 A1* | 11/2014 | Frost | G01R 31/382 324/430 |
| 2015/0032394 A1 | 1/2015 | Kimura et al. | |
| 2015/0058078 A1 | 2/2015 | Ehrenberg et al. | |
| 2015/0112907 A1* | 4/2015 | Nasle | G06N 5/048 706/21 |
| 2015/0142193 A1* | 5/2015 | Golden | H02J 3/32 700/291 |
| 2015/0149979 A1* | 5/2015 | Talby | G06F 11/3664 717/104 |
| 2015/0171640 A1* | 6/2015 | Lee | G01R 31/367 320/109 |
| 2015/0184550 A1 | 7/2015 | Wichmann | |

(56) References Cited

U.S. PATENT DOCUMENTS

| | | | |
|---|---|---|---|
| 2015/0214757 A1* | 7/2015 | Zane | H02J 7/0021 |
| | | | 320/107 |
| 2015/0227148 A1* | 8/2015 | Tanaka | G06Q 10/0631 |
| | | | 700/291 |
| 2015/0253749 A1 | 9/2015 | Kniazev et al. | |
| 2015/0279182 A1 | 10/2015 | Kanaujia et al. | |
| 2015/0288186 A1* | 10/2015 | Sun | H02J 3/14 |
| | | | 700/291 |
| 2015/0326038 A1* | 11/2015 | Lee | H02J 7/007 |
| | | | 320/134 |
| 2015/0340744 A1* | 11/2015 | Knobloch | H01M 10/48 |
| | | | 429/61 |
| 2015/0355283 A1* | 12/2015 | Lee | G01R 31/3842 |
| | | | 702/63 |
| 2015/0370228 A1 | 12/2015 | Kohn et al. | |
| 2015/0370232 A1 | 12/2015 | Kohn et al. | |
| 2016/0001672 A1* | 1/2016 | Lee | B60L 58/21 |
| | | | 320/136 |
| 2016/0004228 A1 | 1/2016 | Kohn | |
| 2016/0018806 A1 | 1/2016 | Kohn et al. | |
| 2016/0048757 A1* | 2/2016 | Nasle | G06F 30/20 |
| | | | 706/21 |
| 2016/0103184 A1* | 4/2016 | Kawai | G01R 31/367 |
| | | | 702/63 |
| 2016/0109868 A1* | 4/2016 | Harrant | H02J 7/007 |
| | | | 700/295 |
| 2016/0125435 A1 | 5/2016 | Kohn et al. | |
| 2016/0202670 A1* | 7/2016 | Ansari | G05B 13/048 |
| | | | 700/45 |
| 2016/0216699 A1* | 7/2016 | Pekar | G05B 13/048 |
| 2016/0216708 A1 | 7/2016 | Krivoshein et al. | |
| 2016/0258361 A1* | 9/2016 | Tiwari | G06Q 50/06 |
| 2016/0259011 A1* | 9/2016 | Joe | G01R 31/3835 |
| 2016/0336765 A1* | 11/2016 | Trimboli | H02J 7/0021 |
| 2016/0336767 A1* | 11/2016 | Zane | H02J 7/0068 |
| 2016/0372924 A1* | 12/2016 | Kouroussis | G05B 15/02 |
| 2017/0026722 A1* | 1/2017 | Schwartz | G01M 3/22 |
| 2017/0102725 A1* | 4/2017 | Parvania | H02J 3/00 |
| 2017/0109674 A1* | 4/2017 | Parvania | H02J 3/32 |
| 2017/0222447 A1* | 8/2017 | Ravi | H02J 7/0071 |
| 2017/0222448 A1* | 8/2017 | MirTabatabaei | H01M 10/425 |
| 2017/0237302 A1* | 8/2017 | Sorge | H02J 7/045 |
| | | | 307/104 |
| 2017/0244137 A1* | 8/2017 | Guo | G01R 31/382 |
| 2017/0259684 A1* | 9/2017 | Lee | H02J 7/0047 |
| 2017/0271984 A1* | 9/2017 | Kohn | H02J 7/0063 |
| 2017/0288414 A1* | 10/2017 | Klein | B60L 58/16 |
| 2017/0302218 A1* | 10/2017 | Janik | B63B 21/50 |
| 2017/0315517 A1 | 11/2017 | da Silva et al. | |
| 2017/0315523 A1* | 11/2017 | Cross | G05B 17/02 |
| 2017/0324118 A1* | 11/2017 | Ishishita | H01M 10/443 |
| 2017/0338666 A1* | 11/2017 | Christensen | H02J 7/0021 |
| 2018/0004239 A1* | 1/2018 | Golden | H04L 67/10 |
| 2018/0031639 A1* | 2/2018 | Heiries | G01R 31/3648 |
| 2018/0197253 A1* | 7/2018 | ElBsat | G06Q 30/0284 |
| 2018/0217568 A1* | 8/2018 | Parvania | G05B 13/048 |
| 2018/0356783 A1* | 12/2018 | Kohn | B60W 10/08 |
| 2019/0033391 A1* | 1/2019 | Iwane | G01R 31/396 |
| 2019/0041817 A1* | 2/2019 | Kohn | G05B 13/041 |
| 2019/0044440 A1* | 2/2019 | Kohn | H02M 3/156 |
| 2019/0100110 A1* | 4/2019 | Sun | G05B 13/041 |
| 2019/0109465 A1* | 4/2019 | MirTabatabaei | G01R 31/367 |
| 2019/0120908 A1* | 4/2019 | Naha | H01M 10/486 |
| 2019/0176639 A1* | 6/2019 | Kumar | B60L 3/0046 |
| 2019/0213695 A1* | 7/2019 | ElBsat | G06Q 50/06 |
| 2019/0265308 A1* | 8/2019 | Fink | G01R 31/3648 |
| 2019/0283619 A1* | 9/2019 | Metzger | H02J 1/102 |
| 2020/0150705 A1* | 5/2020 | Golden | H04L 67/10 |
| 2020/0164763 A1* | 5/2020 | Holme | B60L 58/10 |

FOREIGN PATENT DOCUMENTS

| | | | | |
|---|---|---|---|---|
| JP | 2008-546370 A | 12/2008 | | |
| JP | 2015-025685 A | 2/2015 | | |
| JP | 2016-105672 A | 6/2016 | | |
| WO | WO-2013177923 A1 * | 12/2013 | | G06Q 50/06 |
| WO | 2014030349 | 2/2014 | | |
| WO | 2014089959 A1 | 6/2014 | | |
| WO | 2016025080 A1 | 2/2016 | | |
| WO | WO-2017178057 A1 * | 10/2017 | | H01M 10/42 |

OTHER PUBLICATIONS

Kohn et al., "Multiple Agent Hybrid Control: Carrier Manifolds and Chattering Approximations to Optimal Contol," 33$^{rd}$ Conference on Decision and Control Lake Buena Vista, FL, Dec. 1994, 7 pages.

Kohn et al., "A Hybrid Systems Approach to Computer-Aided Control Engineering," *IEEE Control Systems* 15(2), 1995, 30 pages.

Kohn et al., "Hybrid Systems as Finsler Manifolds: Finite State Control as Approximation to Connections," *Lecture Notes in Computer Science vol. 999: Hybrid Systems II*, 1995. 28 pages.

Kohn et al., "Viability in Hybrid Systems," *Theoretical Computer Science 138*, 1995, 28 pages.

Kohn et al., "Digital to Hybrid Program Transformations," IEEE International Symposium on Intelligent Control, Dearborn, MI, Sep. 15-18, 1996, 6 pages.

Kohn et al., "Hybrid Dynamic Programming," *Lecture Notes in Computer Science vol. 1201: Hybrid and Real-Time Systems*, 1997, 7 pages.

Kohn et al., "Implementing Sensor Fusion Using a Cost-Based Approach," American Control Conference, Albuquerque, NM, Jun. 1997, 5 pages.

Kohn et al., "Control Synthesis in Hybrid Systems with Finsler Dynamics," *Houston Journal of Mathematics 28*(2), 2002. 23 pages.

Kohn et al., "A Micro-Grid Distributed Intelligent Control and Management System," *IEEE Transactions on Smart Grid 6*(6), Nov. 2015, 11 pages.

Uddin, K., "The effects of high frequency current ripple on electric vehicle battery performance," Applied Energy 178 (2016), 13 pages.

Hyndman, "Forecasting: Principles & Practice", Workshop at University of Western Australia (robjhyndman.com/uwa), 138 pages, Sep. 23-25, 2014.

Leng et al., "Effect of Temperature on the Aging Rate of Li Ion Battery Operating Above Room Temperature," Scientific Reports 5:12967, Aug. 2015, 12 pages.

Shim et al., "Past, present, and future of decision support technology", Decision Support Systems 33 (2002), 16 pages (pp. 111-126).

Liserre et al., "Future Energy Systems", IEEE Industrial Electronics Magazine, Mar. 2010, 20 pages (pp. 18-37).

Sarkis, "A strategic decision framework for green supply chain management", Journal of Cleaner Production 11 (2003) 13 pages (pp. 397-409).

Chong et al., "Sensor Networks: Evolution, Opportunities, and Challenges", Proceedings of the IEEE, vol. 91, No. 8, Aug. 2003, 10 pages (pp. 1247-1256).

Schutter, B. De "Minimal state-space realization in linear system theory: an overview", Journal of Computational and Applied Mathematics, 121 (2000), 24 pages (331-354).

* cited by examiner

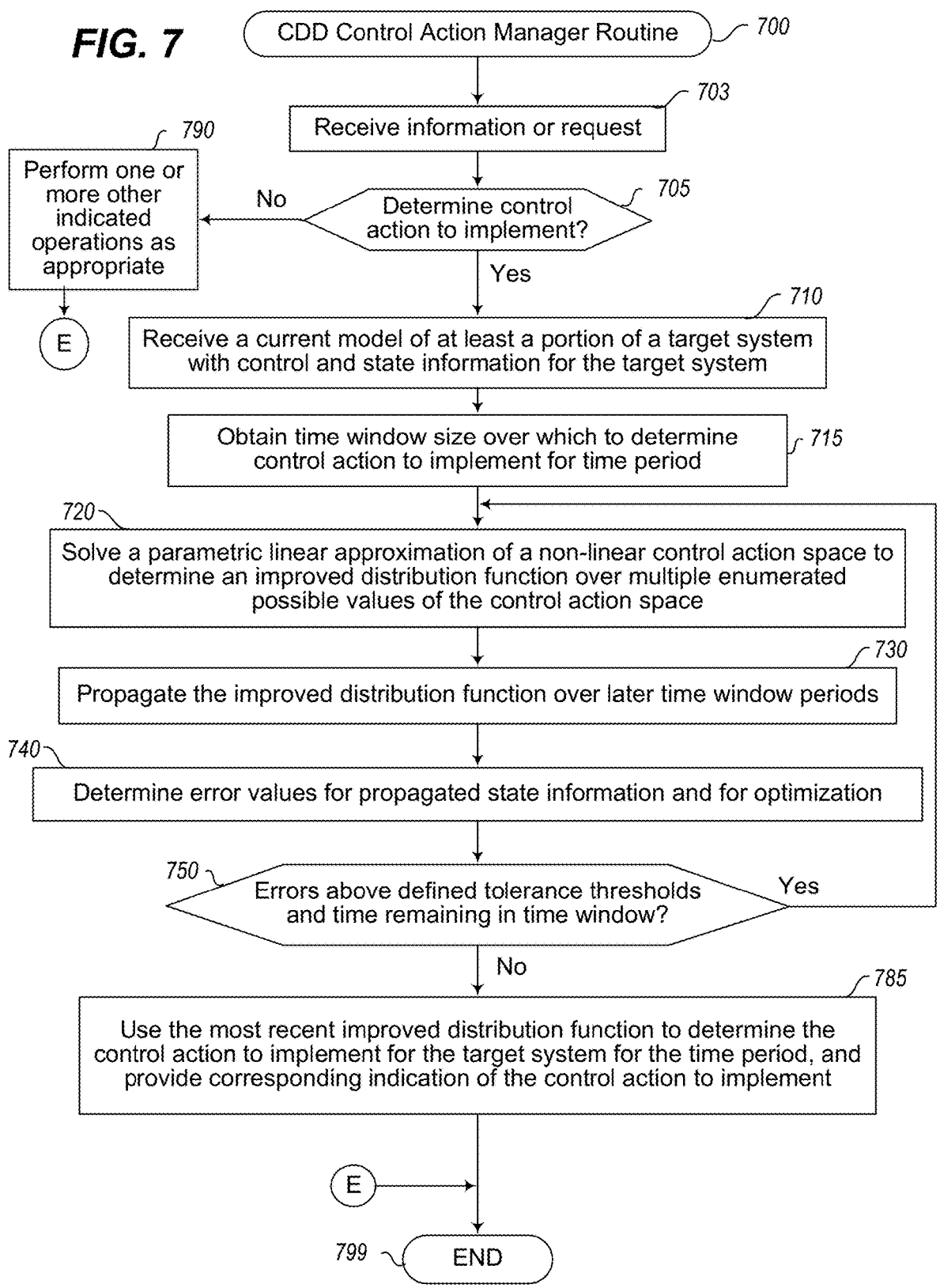

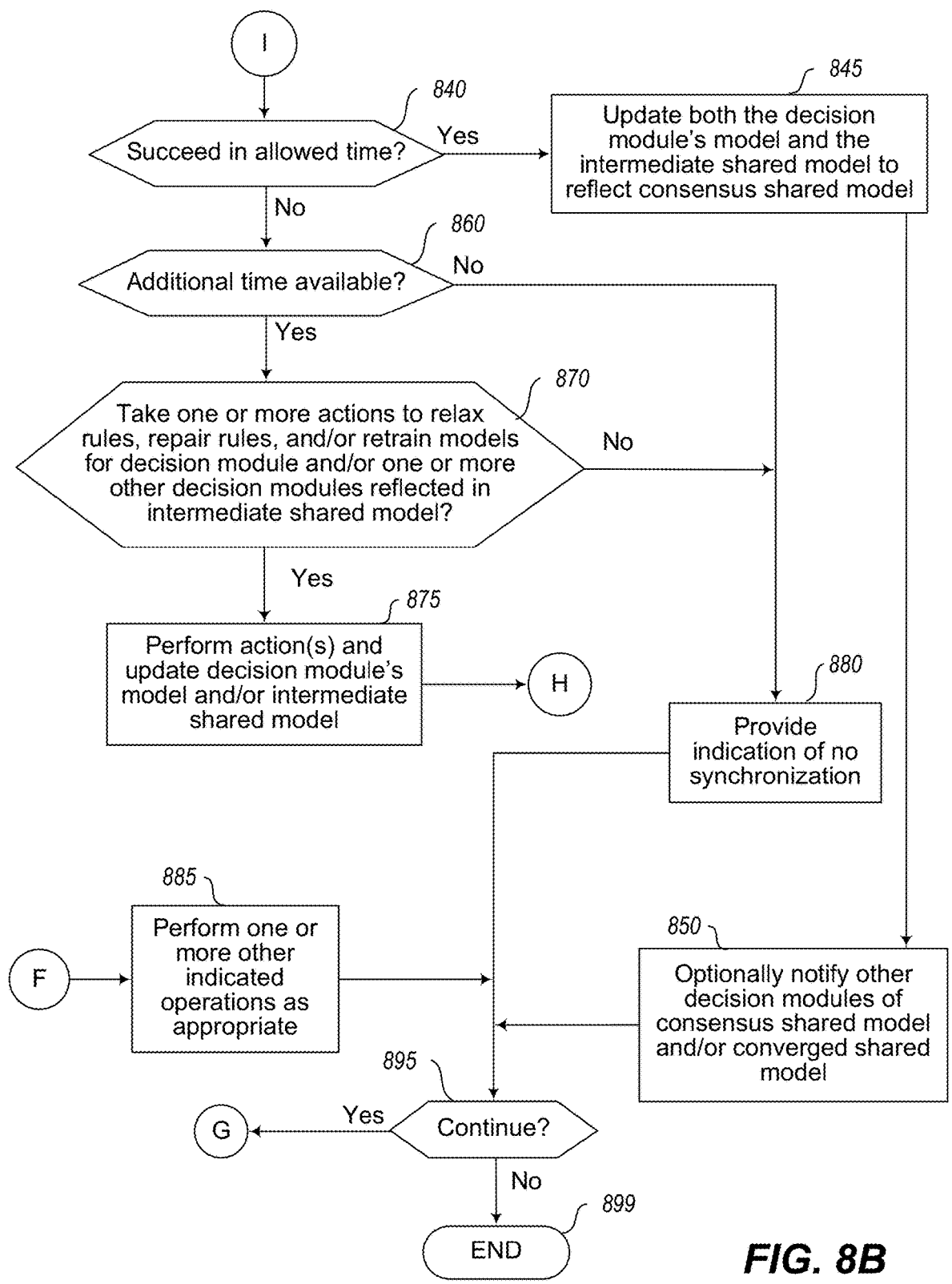

US 11,069,926 B1

CONTROLLING ONGOING BATTERY SYSTEM USAGE VIA PARAMETRIC LINEAR APPROXIMATION

TECHNICAL FIELD

The following disclosure relates generally to techniques for an automated control system to control usage of one or more batteries based at least in part on battery state information, such as to improve the control system's operations using parametric linear approximation while performing other battery power use activities to maximize battery life when supplying requested electrical power.

BACKGROUND

Attempts have been made to implement control systems for various types of physical systems having inputs or other control elements that the control system can manipulate in an attempt to provide desired output or other behavior of the physical systems—one example of such automated control is to manage operations of a battery that is discharging electrical power to support a load and/or is charging using electrical power from a source, while uncertainty exists about an internal temperature and/or chemical state of the battery, and potentially with ongoing changes in load, source and/or internal state of the battery. Such control systems have used various types of architectures and underlying computing technologies to attempt to implement such functionality.

However, various difficulties exist with existing control systems for battery systems, including with respect to managing uncertainty in a current state of a system being controlled and in how different types of inputs will affect operation of the control systems.

BRIEF DESCRIPTION OF THE DRAWINGS

FIG. 7 illustrates a flow diagram of an example embodiment of a CDD Control Action Manager routine.

FIGS. 8A-8B illustrate a flow diagram of an example embodiment of a CDD Coordinated Control Management routine.

DETAILED DESCRIPTION

Figure 1A:
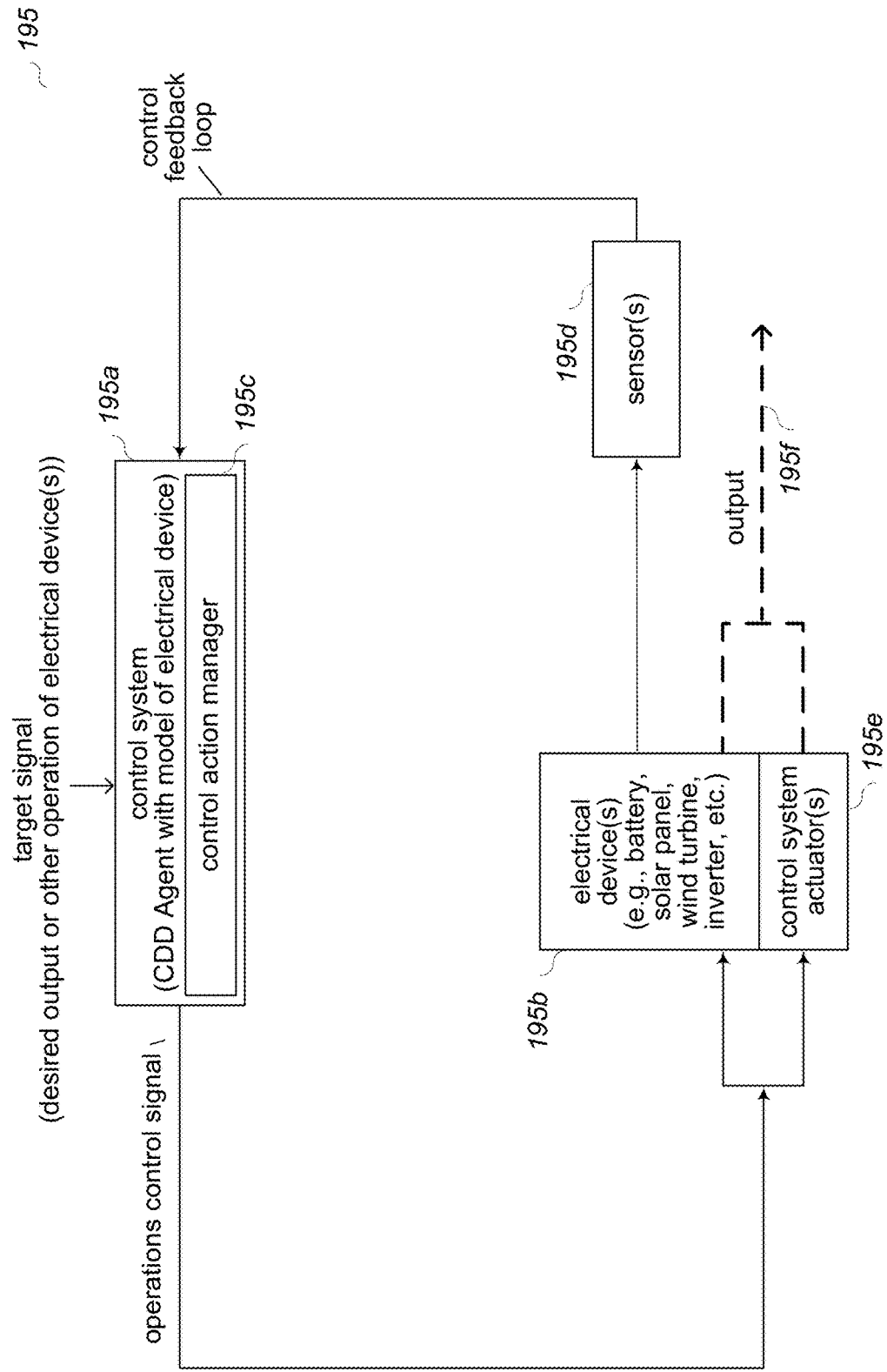
FIG. 1A includes a diagram illustrating use of an automated control system to automatically and repeatedly modify use of an electrical device of a target system to improve its ongoing operation.

Techniques are described for implementing an automated control system to control or otherwise manipulate at least some operations of one or more target physical systems, such as for target systems each including one or more batteries. In at least some embodiments, the described techniques include, as part of the control system implementing control actions to control usage of one or more such batteries (e.g., determining whether and how much power to supply for each of a series of time periods, and implementing the determined power amounts via modifying settings of one or more actuator components), repeatedly performing automated modifications to the control system's ongoing operations to improve functionality for the target system in light of one or more defined goals, such as to increase battery life and/or reduce power dissipation while performing other battery power use activities. For example, in at least some embodiments, controlling a battery's usage may include using a DC-to-DC amplifier (e.g., a field-effect transistor, or FET, amplifier) actuator that is connected to the battery and controls an amount of electrical current and/or voltage being output from the battery (e.g., in a real-time manner and to optimize long-term operation of the battery)—if so, the repeated automated modifications to the control system's operations may, in at least some such embodiments, include using parametric linear approximation to determine a control action using one of multiple enumerated possible values of an available control space (also referred to herein as multiple enumerated possible control values, such as one of multiple impedance levels that a DC-to-DC amplifier actuator supports) that best satisfies the one or more defined goals at a given time in light of current state information (e.g., current output from the battery, voltage from the battery, battery temperature, etc.), and then modifying the DC-to-DC amplifier actuator to currently implement that determined value and corresponding control action (e.g., to implement a determined impedance level) and affect an amount of power supplied to and/or from the battery.

In at least some embodiments, the repeated determining and implementing of one of multiple possible control actions using one of multiple enumerated possible control values that best satisfies one or more defined goals at a given time based on current state information is performed using parametric linear approximation during an available iteration time window before the control value and corresponding control action is to be implemented—furthermore, by gathering further state information after such a control action is implemented and by using it while determining a next control action using one of the control values (e.g., by updating a model of the battery to reflect the further state information and the control value and associated control action that were implemented), the ongoing usage is continually improved via feedback received from the ongoing battery usage. In particular, given a time period in which a control action is to be determined that uses one of multiple enumerated control values, a time window (e.g., less than the time period) may be selected in which to determine the control action for that time period, and an iterative approach using parametric linear approximation for a non-linear control space is implemented during that time window. Such an iterative approach using parametric linear approximation during the time window may include determining a distribution function over the multiple enumerated control values of the non-linear control space that measures the distributions of the control values at a current time, and then performing repeated iterations that each includes (a) solving a linear approximation of the non-linear control space to determine an improved distribution function over the multiple enumerated control values with respect to the one or more defined goals and (b) propagating the improved distribution function over later time periods to determine corresponding results (e.g., by using a current model of the battery to predict future effects of particular further control actions). After some or all such iterations, one or more error values are determined (e.g., for the propagated state information and/or for a degree of optimization from the propagating), and a determination is made if the error value(s) are sufficiently low to proceed (e.g., are below defined error tolerance thresholds)—in some embodiments, the iterating stops once the error value(s) are below the thresholds (even if time remains for one or more further iterations) while in other embodiments the iterations continue until the end of the time window, with the most recent improved distribution function after the last iteration used to determine a 'best' control value to implement as part of a corresponding control action for the time period (e.g., a control value and associated control action that satisfies the one or more defined goals better than the other possible control values and associated control actions). Such automated modifications to one or more control system actuator components to repeatedly implement a determined control action using a determined control value based on current state information and a current model further allows the system to dynamically adapt to various changes that may occur in the target system over time (e.g., to changing battery performance over time due to changes in battery charge level and/or internal battery chemistry). Additional details are described below related to performing such described techniques for repeatedly performing automated modifications to the control system's ongoing operations to improve functionality, and some or all of the described techniques are performed in at least some embodiments by automated operations of one or more control action manager components, optionally as part of or in conjunction with one or more CDD (Collaborative Distributed Decision) systems controlling specific target systems that include one or more batteries.

In addition, the described techniques may in at least some embodiments generate and use a model of a target system that is under control by encoding the dynamics of the target system (e.g., from sensory data and actions of the target system) in a function of the state of the target system referred to as a data Hamiltonian model, including in at least some embodiments and situations to update the model as additional information becomes available (e.g., as additional state information is obtained, to indicate further control actions that are performed, etc.)—in particular, some characteristics of the target system under control may not be completely known (e.g., internal state of the battery), with the data Hamiltonian encoding the currently known information. Such a data Hamiltonian may be implemented as a function that captures the flow and interdependence of a data domain, and may have three types of variables (e.g., state variables, flow variables, and decision or control variables) and one or more associated goals (e.g., to maximize battery life while satisfying as many requests for power from the battery as possible), with behavior of the data Hamiltonian controlled at least in part by binary and other rules that specify control actions to perform in light of current state information (e.g., absolute rules that characterize the unchanging physics of a physical target system being controlled and have binary true/false values; hard rules that characterize the desired behavior and goals and have binary true/false values; soft rules that characterize empirical knowledge of system operation, such as heuristic strategies, economic dispatch, and response to anomalies and learning strategies, and have variable, probabilistic truth values in a range $[0,1]$, as well as associated confidence values; etc.). The control system may use the model and current state information as part of determining the control actions to currently perform, such as in a manner to satisfy defined constraints and other goals of the control system in light of its current state, while attempting to satisfy the requested output or other desired operation of the target system if possible. Additional details are included below regarding the generation and use of such target system models.

The described techniques involving the use of parametric linear approximation during an available time window to determine a control action to implement in light of current state information and one or more defined goals may provide a variety of benefits and advantages. In particular, many traditional control system approaches involving batteries have been ineffective for controlling complex systems in which internal state information cannot be determined, while the use of the described techniques overcome such problems based at least in part by repeatedly improving the operation of the control system via feedback from ongoing operations and the iterative determination of an improved distribution function over multiple enumerated possible control values to use. Such traditional control system approaches typically involve the system designers beginning with requirements for battery system behavior, using the requirements to develop a static model of the system, and attempting to optimize the run-time battery system operations in light of defined criteria. Conversely, in at least some embodiments, the described techniques of a control state manager component do not need to use such criteria, nor to develop such a resulting static model, nor to do such optimization—instead, an idealized behavior of a battery system is expressed and used to create an idealized behavioral model (e.g., expressed as an idealized data Hamiltonian system model), and run-time operations repeatedly improve the functionality of the control system (e.g., continuously) by the iterative determination of improved distribution functions over multiple enumerated possible control values to use.

FIG. 1A includes an example diagram 195 illustrating how a control action manager component of a control system may be used to improve functionality while the control system is controlling a target system using an electrical device 195b—the electrical device may be a battery in at least some embodiments, as discussed in greater detail elsewhere herein (including with respect to the examples of FIGS. 2A-2C), although in other situations the electrical device may be part of or otherwise have other forms (e.g., a solar panel, wind turbine, inverter, fuel cell, solid waste generator, motor, computing device, other active loads, etc.).

In this example, a control system 195a performs a control loop to control ongoing operation of the electrical device 195b of the target system, such as to drive the target system to a desired dynamic behavior. In particular, the control system may include or be implemented as a CDD agent (as discussed in greater detail below with respect to FIGS. 1B-1C, as well as elsewhere herein), and include a model (not shown) of the target system that was previously generated based in part on data obtained from actual operation of the target system over time (such as to identify some or all inputs supplied to the target system; resulting outputs from the target system, such as sensor data measured regarding operations of the target system from sensors 195d, etc.)—the system model is a representation of the target system and its operations, and in this example is in the form of a total data Hamiltonian function $H_T$, as discussed in greater detail below. As part of the operation of the control system 195a, it receives a target signal that represents a request for a desired output or other desired operation of the electrical device 195b of the target system, and uses information from its overall system model to determine an operations control signal (e.g., an energy supply control signal if the control system determines to satisfy a request for energy using an electrical device that provides energy, optionally with an amount of energy to supply) to send to the electrical device that satisfies defined constraints and other goals of the control system in light of its current state, while attempting to satisfy the desired output or other desired operation of the target signal if possible. The electrical device receives the control signal, and optionally performs a corresponding output 195f as appropriate, with that output and/or other characteristics of the electrical device being measured at least in part by the one or more sensors 195d (e.g., a suite of multiple passive sensors). The sensors 195d may further supply their measured readings to the control system 195a, such as to update corresponding state information in the system model, with the control system 195a continuing to control operation of the electrical device 195b for a next target signal (e.g., in a continuous or substantially continuous manner, and such as based on a system model that is updated in a continuous or substantially continuous manner based at least in part on readings from the sensors 195d).

The control system 195a of FIG. 1A further includes a control action manager component 195c that may repeatedly (e.g., continuously) improve functionality by performing parametric linear approximation during an available time window to determine a control action for the control system 195a to implement in light of current state information and one or more defined goals, such as by determining control values to use to set attributes or other state information of one or more control system actuators that regulate operation of the electrical device (e.g., to affect how and whether operations of the control system actuator(s) are performed). In the example of FIG. 1A, the control system includes one or more control system actuators 195e that receive the operations control signal from the control system and modify activities of the control system actuator(s) to dynamically regulate the behavior of the electrical device, although in other embodiments the control system actuator(s) may operate in other manners (e.g., provide a defined type of regulation until corresponding attributes are modified by the control system). As previously noted, the control system actuator(s) may include, for example, a DC-to-DC amplifier that is connected to the electrical device and controls an amount of electrical current and/or voltage being output from the electrical device, such as by providing a configurable amount of resistance—if so, the adjustments determined by the control action manager component 195c to the attributes or other state information of the control system actuator(s) 195e may include, for example, changing a level of resistance and/or an amount of time that a resistance level is used. In particular, the control action manager component receives feedback from the sensors 195d corresponding to current operation of the electrical device 195b as regulated by the control system actuator(s) 195e, uses the feedback as part of performing repeated iterations involving performing a linear approximation of a non-linear control space to determine an improved distribution function over multiple enumerated possible control values with respect to the one or more defined goals and involving propagating the improved distribution function over later time periods, and uses the final improved distribution function after the iterations to determine a control value for current use in making one or more modifications or other adjustments to the control system actuator(s) to improve functionality. Additional details are included below regarding the operations of the control state manager component.

With respect to such an overall system model of a target system that includes an electrical device, the target system may, for example, include one or more batteries used to store and provide electrical power (e.g., for a local load, for an electrical grid that supports various loads in various locations, etc.), and the automated operations to control the target system may include using characteristics of at least one such battery in the target system to perform automated control of DC (direct current) power that is provided from and/or stored by that battery. In such embodiments, the automated operations of one or more CDD agents may include generating an overall system model of battery performance by receiving information about inputs to, outputs from, control signal instructions provided to and other attributes related to the one or more batteries (e.g., electrical current and/or voltage being output for use, electrical current and/or voltage being input for storage, temperature readings external to the one or more batteries as part of their surrounding environment, etc.), and using such information as part of modeling current operational characteristics of the one or more batteries—given such modeled information, the CDD agent(s) that control the one or more batteries may then use such information to make decisions on current and/or future control actions in a manner that reflects actual behavior of the target system.

However, before further discussion of the control state manager component and its functionality, a more general description of the control of target systems using such representations and other models is provided.

Figure 1B:
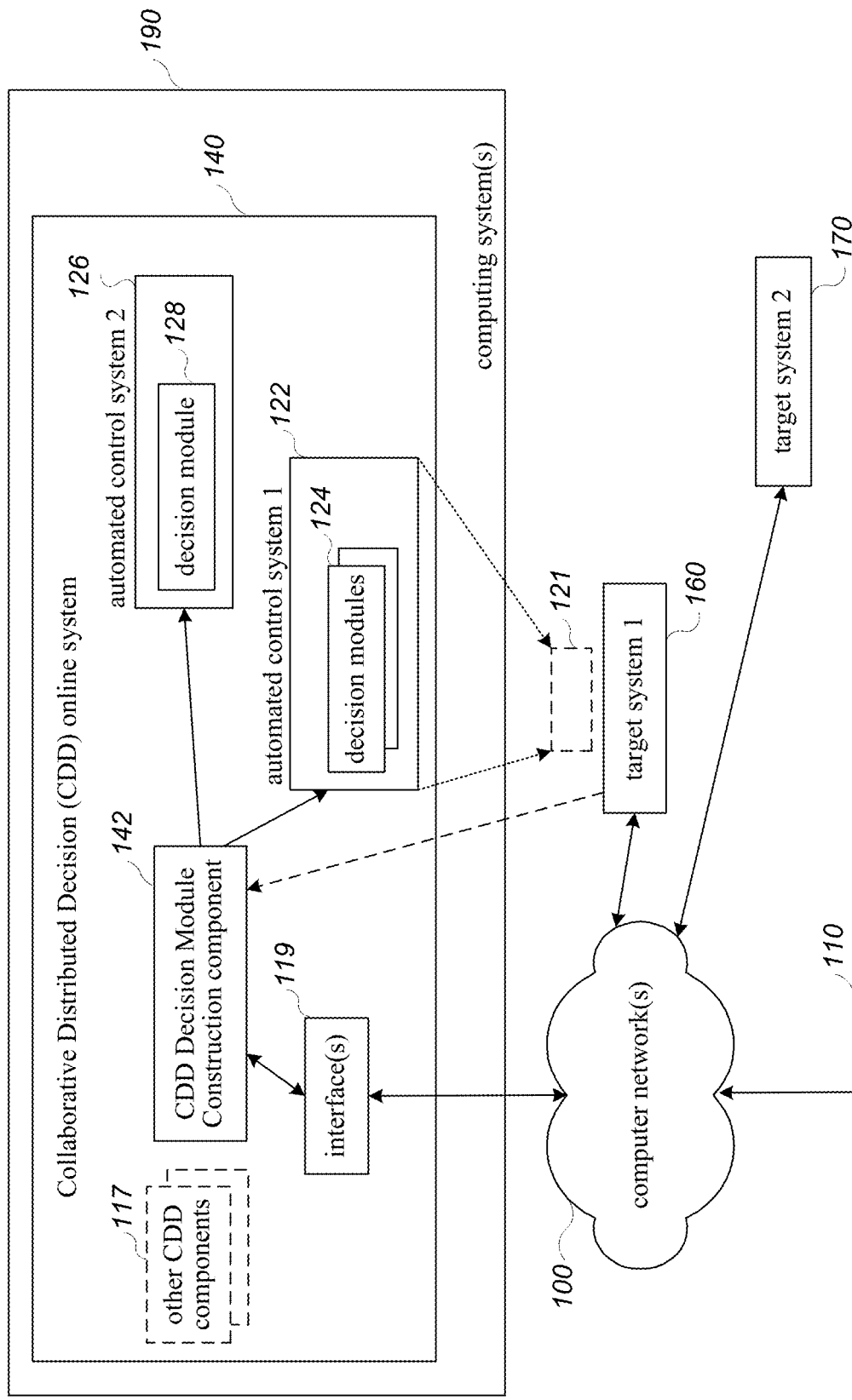
FIG. 1B is a network diagram illustrating an example environment in which a system for performing cooperative distributed control of target systems may be configured and initiated.

In particular, FIG. 1B is a network diagram illustrating an example environment in which a system for performing cooperative distributed control of one or more target systems may be configured and initiated. In particular, an embodiment of a CDD system 140 is executing on one or more computing systems 190, including in the illustrated embodiment to operate in an online manner and provide a graphical user interface (GUI) (not shown) and/or other interfaces 119 to enable one or more remote users of client computing devices 110 to interact over one or more intervening computer networks 100 with the CDD system 140 to configure and create one or more decision modules to include as part of an automated control system to use with each of one or more target systems to be controlled. While not illustrated in FIG. 1B, the CDD system 140 may include and use one or more control state manager components as discussed herein, such as to include one or more such control state manager components in one or both of the automated control systems 1 and 2.

Target system 1 160 and target system 2 170 are example target systems illustrated in this example, although it will be appreciated that only one target system or numerous target systems may be available in particular embodiments and situations, and that each such target system may include a variety of mechanical, electronic, chemical, biological, and/or other types of components to implement operations of the target system in a manner specific to the target system. In this example, the one or more users (not shown) may interact with the CDD system 140 to generate an example automated control system 122 for target system 1, with the automated control system including multiple decision modules (or "agents") 124 in this example that will cooperatively interact to control portions of the target system 1 160 when later deployed and implemented. The interactions of the users with the CDD system 140 to create the automated control system 122 may involve a variety of interactions over time, including in some cases independent actions of different groups of users. In addition, as part of the process of creating and/or training or testing automated control system 122, it may perform one or more interactions with the target system 1 as illustrated, such as to obtain partial initial state information, although some or all training activities may in at least some embodiments include simulating effects of control actions in the target system 1 without actually implementing those control actions at that time. In some embodiments and situations, such initial user interactions may be used to generate an initial rule-based overall system model of a target system that is based at least in part on binary rules.

After the automated control system 122 is created, the automated control system may be deployed and implemented to begin performing operations involving controlling the target system 1 160, such as by optionally executing the automated control system 122 on the one or more computing systems 190 of the CDD system 140, so as to interact over the computer networks 100 with the target system 1. In other embodiments and situations, the automated control system 122 may instead be deployed by executing local copies of some or all of the automated control system 122 (e.g., one or more of the multiple decision modules 124) in a manner local to the target system 1, as illustrated with respect to a deployed copy 121 of some or all of automated control system 1, such as on one or more computing systems (not shown) that are part of or otherwise associated with the target system 1. Each such decision module may, for example, perform activities similar to those of control system 195a of FIG. 1A, such as with respect to a respective electrical device being controlled by that decision module. In addition, in embodiments and situations in which initial user interactions are used to generate an initial rule-based system model of a target system using binary rules, the initially deployed automated control system 122 may be based on such an initial rule-based system model, and data from the operation of the target system under control of that initially deployed automated control system 122 may be gathered and used to include information about current characteristics of the target system in a revised model of the target system, and/or the functionality of the control system may be improved over time using functionality of a control action manager component as discussed elsewhere herein.

In a similar manner to that discussed with respect to automated control system 122, one or more users (whether the same users, overlapping users, or completely unrelated users to those that were involved in creating the automated control system 122) may similarly interact over the computer network 100 with the CDD system 140 to create a separate automated control system 126 for use in controlling some or all of the target system 2 170. In this example, the automated control system 126 for target system 2 includes only a single decision module (or "agent") 128 that will perform all of the control actions for the automated control system 126, such as in a manner similar to that illustrated for control system 195a of FIG. 1A. The automated control system 126 may similarly be deployed and implemented for target system 2 in a manner similar to that discussed with respect to automated control system 122, such as to execute locally on the one or more computing systems 190 and/or on one or more computing systems (not shown) that are part of or otherwise associated with the target system 2, although a deployed copy of automated control system 2 is not illustrated in this example. It will be further appreciated that the automated control systems 122 and/or 126 may further include other components and/or functionality that are separate from the particular decision modules 124 and 128, respectively, although such other components and/or functionality are not illustrated in FIG. 1B.

The network 100 may, for example, be a publicly accessible network of linked networks, possibly operated by various distinct parties, such as the Internet, with the CDD system 140 available to any users or only certain users over the network 100. In other embodiments, the network 100 may be a private network, such as, for example, a corporate or university network that is wholly or partially inaccessible to non-privileged users. In still other embodiments, the network 100 may include one or more private networks with access to and/or from the Internet. Thus, while the CDD system 140 in the illustrated embodiment is implemented in an online manner to support various users over the one or more computer networks 100, in other embodiments a copy of the CDD system 140 may instead be implemented in other manners, such as to support a single user or a group of related users (e.g., a company or other organization, such as if the one or more computer networks 100 are instead an internal computer network of the company or other organization, and with such a copy of the CDD system optionally not being available to other users external to the company or other organizations). In addition, the CDD system 140, each of its components (including component 142 and optional other components 117, such as one or more CDD Control Action Manager components and/or one or more CDD Coordinated Control Management components), each of the decision modules, and/or each of the automated control systems may include software instructions that execute on one or more computing systems (not shown) by one or more processors (not shown), such as to configure those processors and computing systems to operate as specialized machines with respect to performing their programmed functionality.

As noted above, various types of data may be obtained and used as part of modeling operational characteristics of a target system in a general overall model, including information about prior input data to the target system and resulting behavior of the target system. In some embodiments and situations, such data may include data that is gathered in an automated manner from one or more types of hardware sensors, and in some embodiments and situations, such data may include information about actions of human users or otherwise information about such humans. The term "sensor" and "sensor data" as used herein generally refers to such data regardless of source or type, including data from hardware sensors, unless otherwise indicated with respect to a particular situation. In addition, the improvements to control system functionality that are performed by a control state manager component may in at least some embodiments be performed to complete or repair or otherwise address conflicts in state information for one or more parts of the target system, such as from lack of sufficient internal state structure information or other information, and to enable learning of or other improvements to results of performing control actions.

Figure 1C:
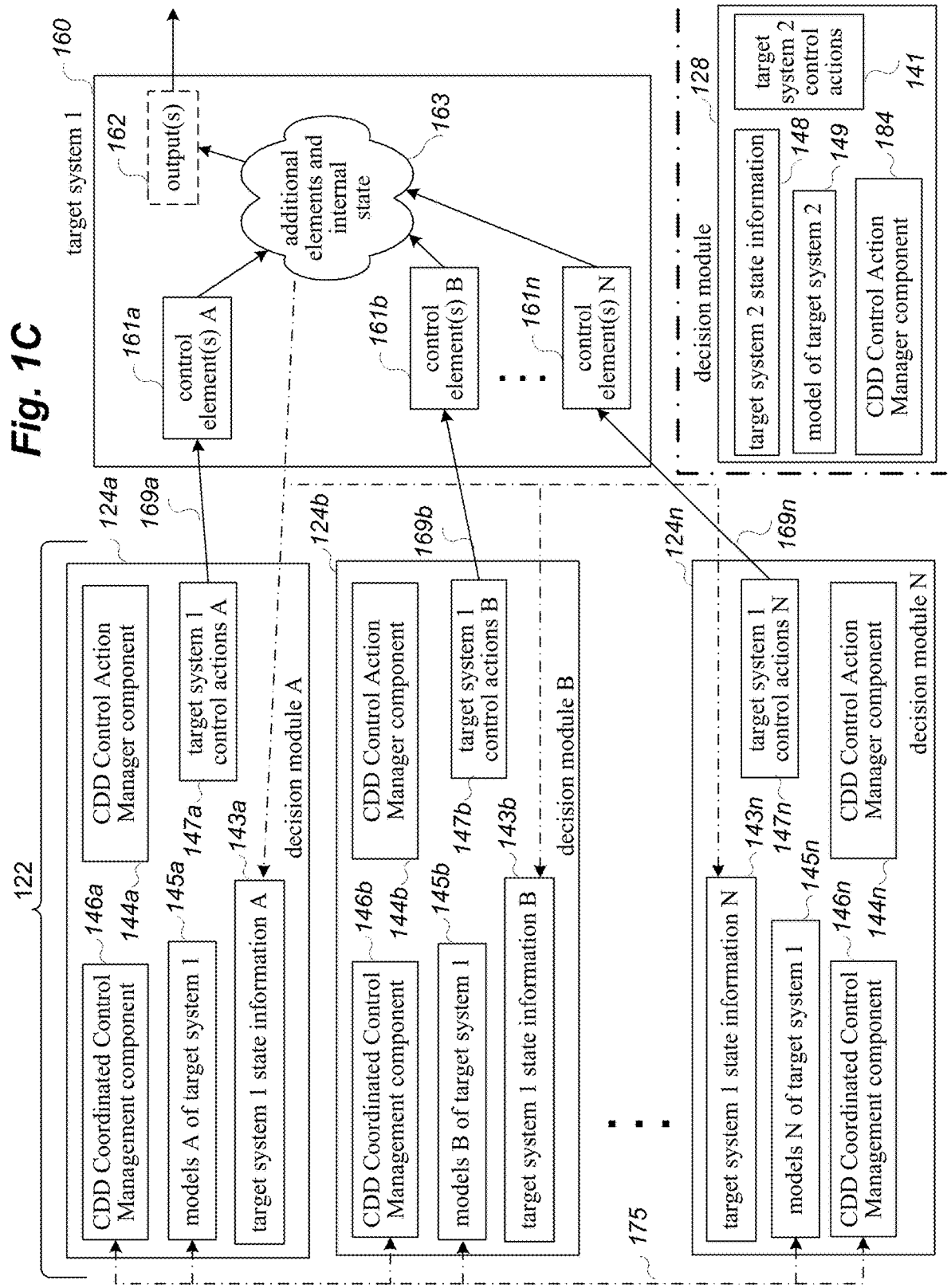
FIG. 1C is a network diagram illustrating an example environment in which a system for performing cooperative distributed control of target systems may be implemented.

FIG. 1C is a network diagram illustrating an example environment in which a system for performing cooperative distributed control of target systems may be implemented, and in particular continues the examples discussed with respect to FIG. 1B. In the example environment of FIG. 1C, target system 1 160 is again illustrated, with the automated control system 122 (whether an initial or revised version) now being deployed and implemented to use in actively controlling the target system 1 160. In the example of FIG. 1C, the decision modules 124 are represented as individual decision modules 124a, 124b, etc., to 124n, and may be executing locally to the target system 1 160 and/or in a remote manner over one or more intervening computer networks (not shown). In the illustrated example, each of the decision modules 124 includes a local copy of a CDD Control Action Manager component 144, such as with component 144a supporting its local decision module 124a, component 144b supporting its local decision module 124b, and component 144n supporting its local decision module 124n. Similarly, the actions of the various decision modules 124 are coordinated and synchronized in a peer-to-peer manner in the illustrated embodiment, with each of the decision modules 124 including a copy of a CDD Coordinated Control Management component 146 to perform such synchronization, with component 146a supporting its local decision module 124a, component 146b supporting its local decision module 124b, and component 146n supporting its local decision module 124n. One or more of the decision modules 124 may further include a local copy of one or more other CDD components, although such other CDD components are not illustrated in this example.

As the decision modules 124 and automated control system 122 execute, various interactions 175 between the decision modules 124 are performed, such as to share information about current models and other state of the decision modules to enable cooperation and coordination between various decision modules, such as for a particular decision module to operate in a partially synchronized consensus manner with respect to one or more other decision modules (and in some situations in a fully synchronized manner in which the consensus actions of all of the decision modules 124 converge). During operation of the decision modules 124 and automated control system 122, various state information 143 may be obtained by the automated control system 122 from the target system 160, such as initial state information and changing state information over time (e.g., from passive and/or active sensors, not shown), and including outputs or other results in the target system 1 from control actions performed by the decision modules 124.

The target system 1 in this example includes various control elements 161 that the automated control system 122 may manipulate (e.g., various actuators for corresponding batteries, not shown), and in this example each decision module 124 may have a separate group of one or more control elements 161 that it manipulates (such that decision module A 124a performs interactions 169a to perform control actions A 147a on control elements A 161a, decision module B 124b performs interactions 169b to perform control actions B 147b on control elements B 161b, and decision module N 124n performs interactions 169n to perform control actions N 147n on control elements N 161n). Such control actions affect the internal state 163 of other elements of the target system 1, including optionally to cause or influence one or more outputs 162. As operation of the target system 1 is ongoing, at least some of the internal state information 163 is provided to some or all of the decision modules to influence their ongoing control actions, with each of the decision modules 124a-124n possibly having a distinct set of state information 143a-143n, respectively, in this example.

As discussed in greater detail elsewhere, each decision module 124 may use such state information 143x and a local sub-model 145x of an overall system model for the target system to determine particular control actions 147x to next perform, such as for each of multiple time periods, although in other embodiments and situations, a particular automated control system may perform interactions with a particular target system for only one time period or only for some time periods. For example, the local CDD Control Action Manager component 144 for a decision module 124 may determine a near-optimal local control action using parametric linear approximation to select one of multiple enumerated control values in a manner based on that decision module's local model 145, and with the local CDD Coordinated Control Management component 146 determining a synchronized consensus set of control actions that reflect other of the decision modules 124, including to update the decision module's local sub-model 145 as appropriate based on such local and/or synchronized control actions that are determined. Thus, during execution of the automated control system 122, the automated control system performs various interactions with the target system 160, including to request state information, and to provide instructions to modify values of or otherwise manipulate control elements 161 of the target system 160. For example, for each of multiple time periods, decision module 124a may perform one or more interactions 169a with one or more control elements 161a of the target system, while decision module 124b may similarly perform one or more interactions 169b with one or more separate control elements B 161b, and decision module 124n may perform one or more interactions 169n with one or more control elements N 161n of the target system 160. In other embodiments and situations, at least some control elements may not perform control actions during each time period. One or more other components may further perform other activities during such control of the target system 160, although such other activities are not illustrated in the example of FIG. 1C.

In addition, while example target system 2 170 of FIG. 1B is not illustrated in FIG. 1C, further details are illustrated for decision module 128 of automated control system 126 for reference purposes, although such a decision module 128 would not typically be implemented together with the decision modules 124 controlling target system 1. In particular, the deployed copy of automated control system 126 includes only the single executing decision module 128 in this example, although in other embodiments the automated control system 126 may include other components and functionality. In addition, since only a single decision module 128 is implemented for the automated control system 126, the decision module 128 includes a local CDD Control Action Manager component 184, any may optionally further include one or more other local CDD components (not shown), but does not in the illustrated embodiment include any local CDD Coordinated Control Management component (since there are not other decision modules with which to synchronize and interact).

While not illustrated in FIGS. 1B and 1C, the distributed nature of operations of automated control systems such as those of 122 allow partially decoupled operations of the various decision modules, include to allow modifications to the group of decision modules 124 to be modified over time while the automated control system 122 is in use, such as to add new decision modules 124 and/or to remove existing decision modules 124. In a similar manner, changes may be made to particular decision modules 124 and/or 128, such as to change rules or other restrictions specific to a particular decision module and/or to change goals specific to a particular decision module over time, with a new corresponding model being generated and deployed within such a decision module, including in some embodiments and situations while the corresponding automated control system continues to control operations of a corresponding target system. In addition, improvements to functionality of particular decision modules may reflect operations of one or more control state manager components to improve and use distribution functions corresponding to one or more control system actuators that regulate one or more respective control elements of the target system at one or more times. In addition, while each automated control system is described as controlling a single target system in the examples of FIGS. 1B and 1C, in other embodiments and situations, other configurations may be used, such as for a single automated control system to control multiple target systems (e.g., multiple inter-related target systems, multiple target systems of the same type, etc.), and/or for multiple automated control systems to operate together to control a single target system, such as by each operating independently to control different portions of that target control system. It will be appreciated that other configurations may similarly be used in other embodiments and situations.

For illustrative purposes, some embodiments are described below in which specific types of data are gathered and used in particular manners to perform specific types of control actions for specific types of target systems, including via particular types of adjustments to particular types of control system actuator(s) to improve particular types of functionality, and via use of particular types of techniques (e.g., parametric linear approximation) to determine particular control actions to perform. However, it will be understood that such described techniques may be used in other manners in other embodiments, including with other types of target systems, and that the invention is thus not limited to the exemplary details provided.

As noted above, in at least some embodiments, the model of a target system to be controlled is encoded as a data Hamiltonian model that is a function of three types of variables (state variables, momentum variables and control variables), and is composed of three additive elements (the physical model, the constrained model and the learned model). The physical and constrained models are determined respectively by the physical principles characterizing the system and operational requirements. In particular, the three types of variables used in the function for the data Hamiltonian model include a vector defining the state of the battery, a vector defining the momentum of the battery, and a vector of action variables that control the battery. The additive elements that compose the data Hamiltonian model include at least Hamiltonians $H_O$ and $H_C$, where $H_O$ is the physical Hamiltonian of the battery, $H_C$ is the constrained Hamiltonian representing the known operational and requirement constraints, and with the total Hamiltonian model in the following form: $H_T=H_O+H_C$, where $H_O$ and $H_C$ are determined from stored operational rules and historical data of the battery. The total Hamiltonian model $H_T$ has the same properties of the Hamiltonian of classic mechanics, but adapted to electrical devices. In addition to the total Hamiltonian model $H_T$ that characterizes the dynamic target system, a control system implemented by the described techniques may in some embodiments use a specified desired behavior Hamiltonian $H_D$, which reflects the desired behavior of the system under control, and affects the dynamics of the control signal produced by the control system. The total Hamiltonian model $H_T$ encodes the evolution of the battery system under control, with the evolution represented in the form of the extended Hamilton Jacobi equations, as follows:

$$\frac{dq(t)}{dt} = \frac{\partial H_T}{\partial p(t)}$$

$$\frac{dp(t)}{dt} = -\frac{\partial H_T}{\partial q(t)}$$

$$\frac{du(t)}{dt} = -\Gamma * \frac{\partial}{\partial u}\left(\frac{d(H_T - H_D)^2}{dt}\right)$$

where q(t) is the state vector of the battery being learned, p(t) is their momentum, and u(t) is the control action vector. The first two equations are classic evolution equations of the dynamics of the dynamic target system, and the last equation describes control of the battery on the DC side to satisfy constraints and approximate the desired behavior represented by $H_D$. The parameter $\Gamma$ is an empirical parameter to enhance stability of the control system.

Figure 2A:
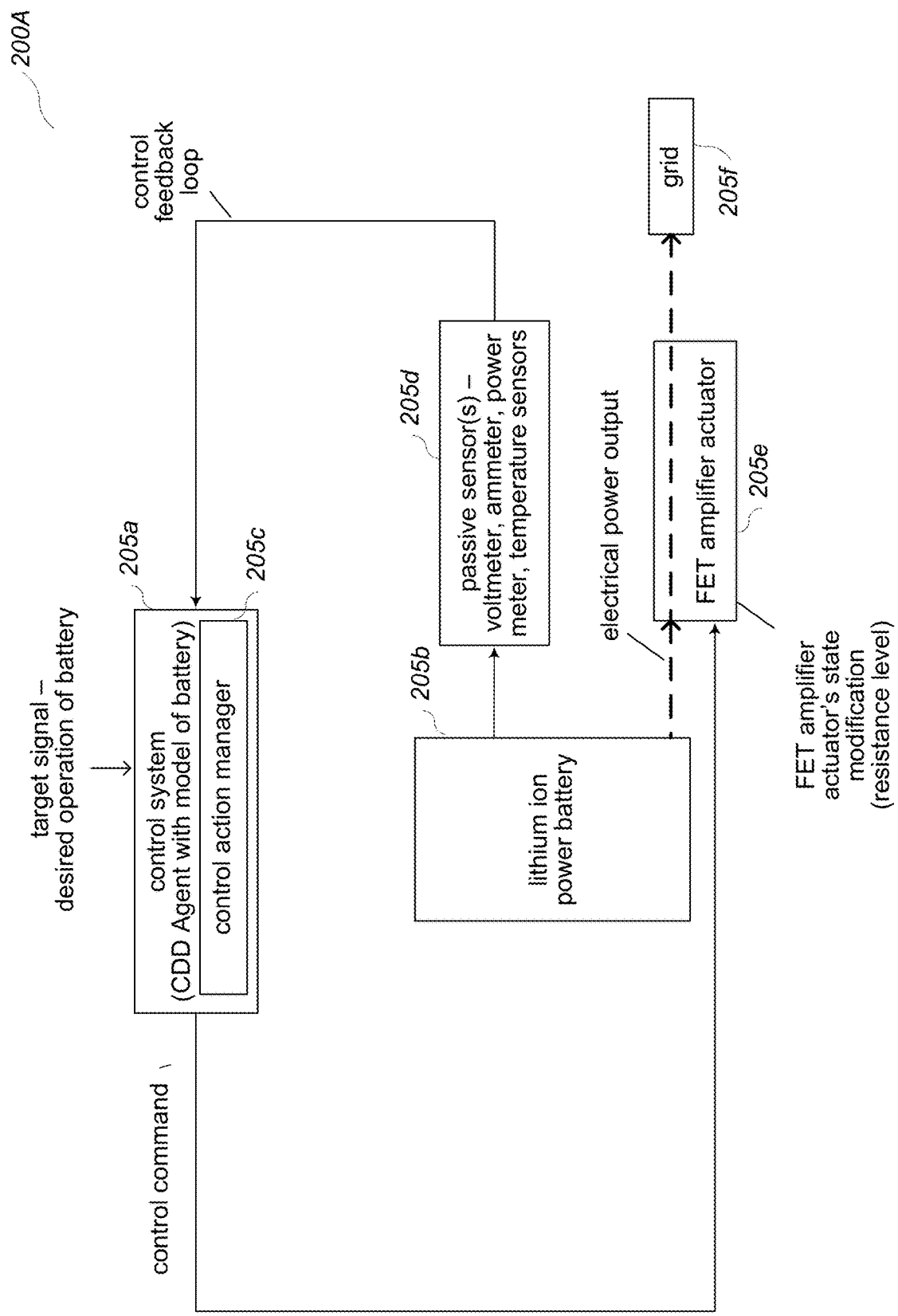
FIGS. 2A-2C illustrate examples of performing techniques to automatically and repeatedly modify a control system's usage of a battery by determining and implementing control actions that modify an actuator affecting battery operations.
Figure 2B:
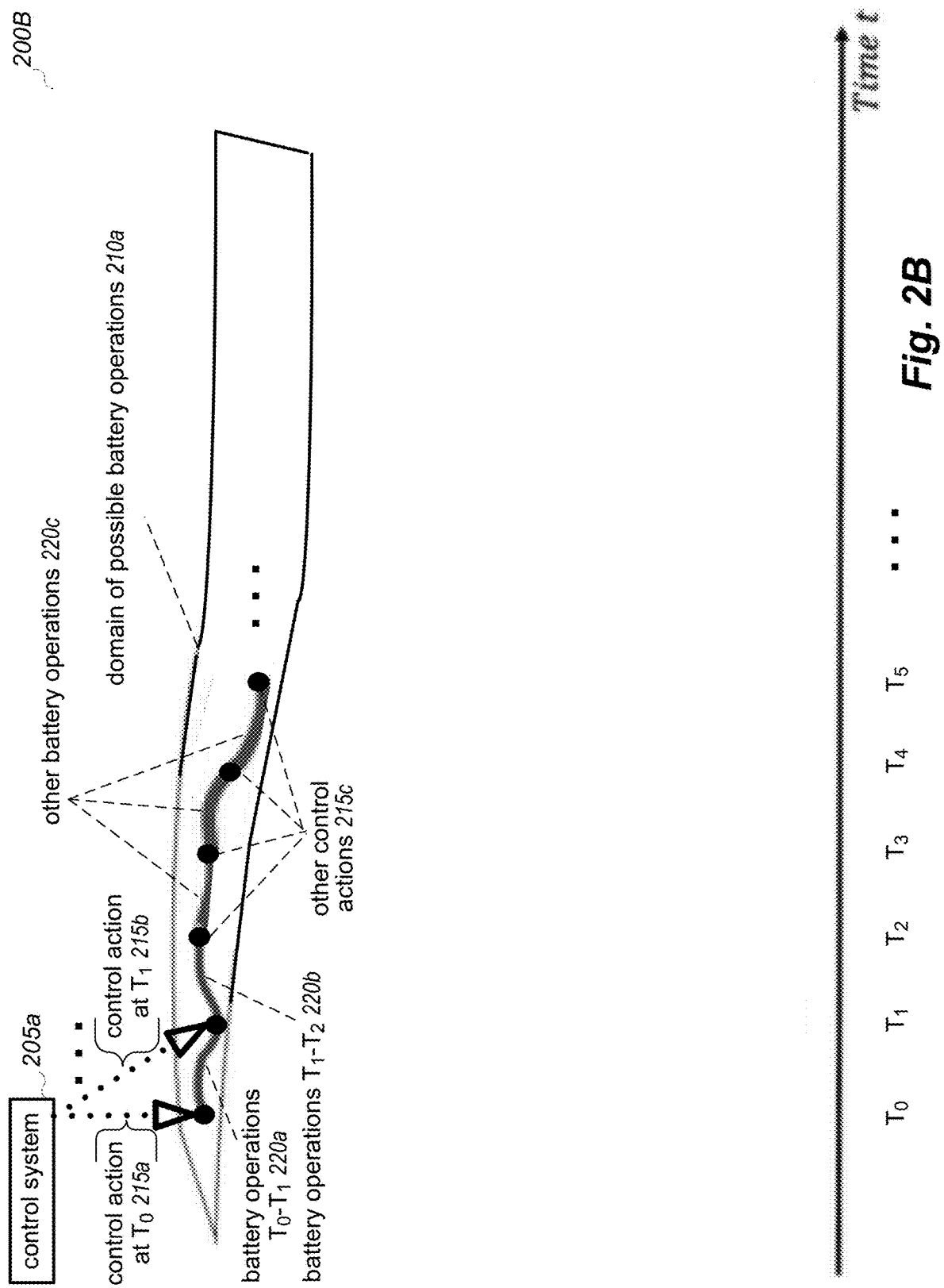
Figure 2C:
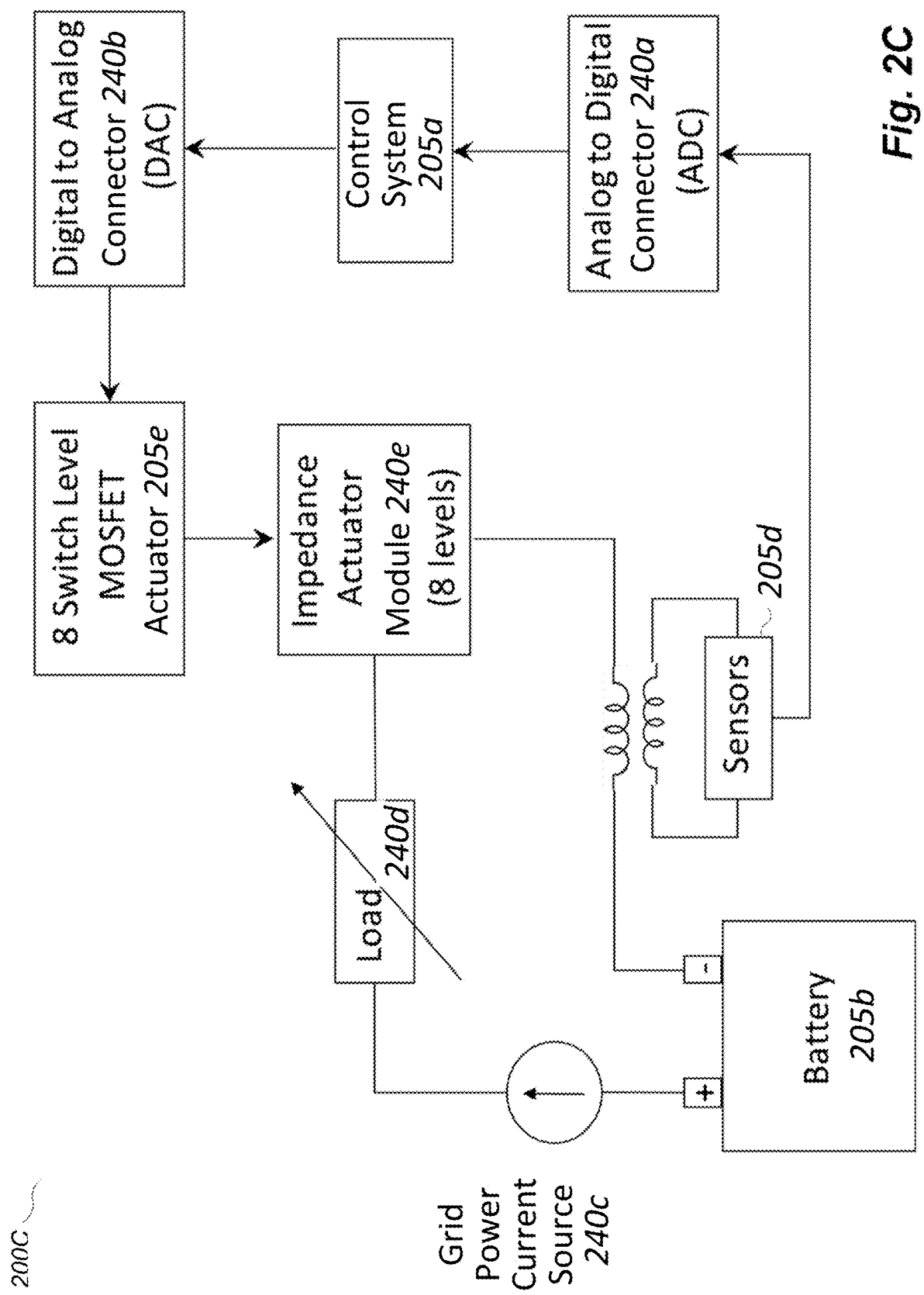

Turning now to FIGS. 2A-2C, these figures illustrate examples of a control action manager component performing techniques to improve functionality of a control system that is controlling a battery, by repeatedly using parametric linear approximation to improve a distribution function used to determine particular control actions to perform using determined ones of multiple enumerated possible control values to modify one or more control system actuators that control DC power from the battery.

In particular, FIG. 2A has similarities to FIG. 1A, but further illustrates information 200A about the use of the control state manager component to improve control system functionality in controlling use of a lithium ion battery system. For example, in at least some embodiments involving a physical target system that includes one or more batteries used to store and provide electrical power, the automated operations to control the target system may include using characteristics of each battery's state to perform automated control of DC (direct current) power that is provided from the battery—in some such embodiments, such control may include using a DC-to-DC amplifier (e.g., a field-effect transistor, or FET, amplifier) connected to the battery to control an amount of electrical current and/or voltage being output from the battery (e.g., in a real-time manner and to optimize long-term operation of the battery), such as FET amplifier actuator 205e of FIG. 2A. Such a DC-to-DC amplifier may, for example, be part of a buck converter (or step-down converter) that steps down voltage while stepping up current from its input (supply) to its output (load) and/or be part of a boost converter (or step-up converter) that steps up voltage while stepping down current from its input (supply) to its output (load), referred to generally at times herein as a "boost/buck controller" or "buck/boost controller". In addition, in some embodiments and situations, multiple batteries may be controlled in such a manner by using multiple control modules that are each associated with one of the batteries, and with the overall control of the multiple batteries being coordinated in a distributed manner (e.g., in a manner similar to that discussed in FIG. 1C and elsewhere herein), such as based on interactions between the multiple associated control modules for the multiple batteries. A system that includes one or more batteries to be controlled may further include additional components in some embodiments and situations, such as one or more electrical sources and/or one or more electrical loads (e.g., electrical grid 205f to receive power output from the battery, and/or to supply power in place of the battery if the battery is controlled to not provide a full amount of requested power), with additional details illustrated in FIG. 2C—another non-exclusive example of such a type of system that is not illustrated in FIG. 2A being a micro-grid with one or more home or business electrical power systems that may optionally include electrical generation sources (e.g., solar panels, wind turbines, etc.) as well as electrical load from the house or business.

As part of controlling use of a lithium ion battery system in FIG. 2A, various illustrated components interact to control operations of the battery according to one or more defined goals in light of defined constraints, rules and other information, as discussed elsewhere herein. In some embodiments, the automated activities to control the battery may be performed in a real-time manner and/or to optimize long-term operation of the battery (e.g., the life of the battery), while satisfying as many external requests for power (e.g., from a utility grid 205f or other load to which the battery can supply power) as is possible (e.g., at least a defined percentage or quantity of such requests)—for example, the control system 205a may attempt to fully or partially satisfy a request from the utility for power (e.g., if the target signal is issued by an operator of the grid 205f) in a real-time manner if the request can be satisfied in a way that also satisfies other constraints on the battery performance given the current state of the battery and the defined goal(s), such as to enable the battery to operate in a desired non-saturation range or level (e.g., with respect to an internal temperature of the battery and/or internal chemistry of the battery). In addition, the control commands sent from the control system 205a to actuator 205e for battery 205b may have various forms in various embodiments, such as a particular impedance level for the FET amplifier actuator 205e to implement, or more generally to specify an amount of power to be generated as DC output of the battery, and/or for the battery to receive electrical power from one or more sources (not shown) to be stored for later use (e.g., at different time periods, or otherwise at different times). The control command related to a power amount to be generated may include information indicating, for example, to increase or decrease the power being output by a specified amount, or to not change the power output. The output of the battery may serve to provide power to one or more loads (e.g., an electrical grid 205f associated with the utility), and in at least some embodiments may be connected to an inverter/rectifier component (not shown) to convert the power output of the battery to AC power to support corresponding loads—such an inverter may, for example, control power being provided from the battery by regulating voltage and/or frequency of the AC power. Similarly, input of the battery may serve to receive power from one or more sources (not shown), and in at least some embodiments may be connected to an inverter/ rectifier component (not shown) to convert AC power input from the sources to DC power for the battery—such a rectifier may, for example, control power being provided to the battery by regulating voltage and/or frequency of the AC power.

In the illustrated example of FIG. 2A, control system 205a is using a control feedback loop to control operation of lithium ion power battery 205b. The control loop has the functionality to drive the battery system to a desired dynamic behavior, which in this example depends on two pieces of information, with a target signal telling the control system 205a the current desired battery output or other battery operation, and the control system using a current total Hamiltonian model (not shown) that characterizes the battery system being controlled. The command signal generated by the control system reflects actions for the battery to perform to satisfy the operational constraints (e.g., to protect the battery and extend battery life) and desired dispatch considerations (e.g., as dictated by a utility or other load 205f requesting power from the battery), and in the illustrated embodiment may be a command for the FET amplifier actuator 205e to implement a specified impedance level (e.g., for a specified amount of time, until it is changed, etc.). The control loop further returns information to the control system 205a about state of the battery 205b (and optionally of a larger system, not shown), including in this example from passive sensors 205d (e.g., to provide information from one or more of a voltmeter, ammeter, power meter, one or more temperature sensors, etc.).

The example of FIG. 2A further illustrates a control action manager component 205c of the control system 205a, which repeatedly (e.g., continuously) improves functionality of the control system by performing parametric linear approximations to determine impedance level control values and associated control actions for the control system to implement via its sent control commands. In this example, the control system uses FET amplifier actuator 205e to actively control the impedance that the battery system "sees", with the control commands sent by the control system each including one of multiple possible impedance levels (e.g., 8 possible impedance levels) that the FET amplifier actuator can implement—as part of doing so, the control action manager in this example embodiment adjusts the impedance (or resistance) at each time period to approach an optimal level given a current state of the battery 205b, and thus to maximize useful lifetime of the battery by improving efficiency of control of battery output on the DC side of the battery (charging or discharging) to optimize for factors such as load satisfaction and/or longevity and/or reducing energy waste, with economic factors also optionally used in some embodiments and situations. In this example, the impedance actuator 205e is directly controlled by the control system and is in series with the battery, such that the impedance is decreased when more power is desired from the battery, and is increased when less power is desired. In at least some embodiments, the impedance is implemented electronically with switches that do not to increase the dissipation. As discussed elsewhere, the control action manager component may determine a control action for the control system 205a to implement in light of current state information and one or more defined goals during an available time window (e.g., as included in a current total Hamiltonian model of the battery). In particular, the control action manager component receives feedback from the sensors 205d corresponding to current operation of the battery 205b as regulated by the actuator(s) 205e, uses the feedback as part of performing repeated iterations involving solving a linear approximation of a non-linear control space to determine an improved distribution function over a control space that include multiple enumerated impedance level control values with respect to the one or more defined goals and involving propagating the improved distribution function over later time periods via use of the battery model, and uses the final improved distribution function after the iterations to determine a particular impedance level control value for use in making one or more modifications or other adjustments to the control system actuator(s) to improve functionality.

Thus, in the illustrated example, the target signal to the control system 205a represents a desired power delivery of the battery (or receipt by the battery) and optionally information about longevity targets, and the control system uses dynamics information from the current status of the battery (e.g., as given by voltage and current sensors) to determine control commands provided to the battery (e.g., whether to supply or receive power, how much power to supply, etc., and particular impedance levels to implement for the battery actuator 205e to produce those effects). To maximize the useful lifetime, the control system also uses information about the model changes of the battery as a function of level of charge, demand, temperature, etc., as well as optionally information about the ions and electrochemical activity within the battery if available. The energy supply signal between the battery/actuator and utility/load 205f in this example is an output electrical power signal generated by the battery and sent to the utility 205f (or other load), as regulated by the FET amplifier actuator 205e, although in other situations may be an input power signal (not shown) for charging the battery from the utility or other power source, as may also optionally be regulated by the FET amplifier actuator 205e.

With respect to an initial model of the battery that is used by the control system 205a, it may in some embodiments be a generic battery model that is applicable to any type of battery, while in other embodiments an initial battery model may be used that is specific to a type of the battery (e.g., a type of chemical reaction used to store and/or generate electricity, such as lithium ion or nickel cadmium), while in yet other embodiments an initial battery model may be used that is designed and/or configured specifically for the particular battery in use. Thus, such an initial battery model that is initially employed in a particular system with a particular battery may be updated over time, such as to reflect improvements from determinations of the control action manager component and/or resulting sensor values after corresponding changes are made to the actuator—when updating a model to a particular battery and/or system, the updating operations may in some embodiments be performed initially in a learning phase before using the automated control system to control the battery, and/or in some embodiments may be performed continuously or periodically while the automated control system is controlling the battery (e.g., to reflect changes over time in an impedance profile of the battery). Additional details are included elsewhere herein regarding such models, including their construction and use.

In addition, in some embodiments the control system may be implemented as multiple separate components (e.g., with a battery controller sub-component implemented in whole or in part in hardware and/or firmware that is attached to the battery or otherwise at a location of the battery, and with other portions of the control system (agent) implemented in part by software instructions executing on one or more computing systems remote from the battery location and optionally communicating with the battery controller over one or more intervening computer networks), while in other embodiments the control system agent may be implemented as a single component (whether at the location of the battery or remote from it). Similarly, while in some embodiments the control action manager component and control system agent may be implemented as separate components (e.g., with the control action manager component implemented in whole or in part at the location of the battery, and/or in whole or in part at a remote location), in other embodiments the control system and control action manager component may be implemented as a single component (whether at the location of the battery or remote from it).

While not illustrated with respect to FIG. 2A, multiple batteries (e.g., tens, hundreds, thousands, millions, etc.) may in some embodiments each have an associated control agent that controls actions of that battery in a similar manner, and with the various batteries acting together in a coordinated manner to supply aggregate power to the utility or to other entities. In such embodiments, the utility or other external entity may send synchronization and monitoring signals for use by the various systems including the batteries, and the multiple control agents associated with the various batteries may interact to exchange information and maintain at least partial coordination between the operations of the batteries.

Some further aspects of performing automated operations to control such a target system with one or more batteries and/or other types are target systems are included in U.S. patent application Ser. No. 15/096,091, filed Apr. 11, 2016 and entitled "Using Battery DC Characteristics To Control Power Output;" and in U.S. patent application Ser. No. 15/410,647, filed Jan. 19, 2017 and entitled "Using Sensor Data To Assist In Controlling A Target System By Modeling The Functionality Of The Target System," which claims the priority benefit of U.S. Provisional Patent Application No. 62/336,418, filed May 13, 2016 and entitled "Using Sensor Data To Assist In Controlling A Target System By Modeling The Functionality Of The Target System;" in U.S. patent application Ser. No. 16/103,788, filed Aug. 14, 2018 and entitled "Using Battery State Excitation To Control Battery Operations"; and in U.S. Patent Application No. 62/796,581, filed Jan. 24, 2019 and entitled "Using Battery State Excitation To Model And Control Battery Operations"; in U.S. patent application Ser. No. 16/103,788, filed Aug. 14, 2018 and entitled "Using Battery State Excitation To Control Battery Operations"; in U.S. Patent Application No. 62/796,521, filed Jan. 24, 2019 and entitled "Model Realization Algorithm"; and in U.S. Patent Application No. 62/796,581, filed Jan. 24, 2019 and entitled "Using Battery State Excitation To Model And Control Battery Operations"; each of which is hereby incorporated by reference in its entirety.

In at least some embodiments, initial modeling of a state of a target system is performed using one or more data Hamiltonian functions, and the described techniques include a control action manager component using one or more types of sensor data to improve functionality of the control system during its operation. A CDD system controlling such a target system may, in at least some embodiments and situations, implement multiple CDD decision modules or sub-systems (also referred to at times herein as CDI, or Collaborative Distributed Inferencing, control agents, such that a particular embodiment of the CDD system with one or more such CDI control agents may be referred to as a CDI system) to distribute the control and management through an agent-based network with synchronization via a mean field Hamiltonian approach, such as with each agent characterized by a data Hamiltonian that defines the dynamics and interaction of one or more corresponding components in the target system, and with each such data Hamiltonian of an agent being dynamically computed from sensory data and actions. Such a data Hamiltonian (for a single target system component) and/or mean field Hamiltonian (for multiple coordinated target system components) can be thought of as a mathematical function that helps navigate a query through huge bodies of information by defining a spectrum of possible outcomes, including to model history, current situation and possible options. Non-exclusive example embodiments using such techniques are further described herein, but it will be appreciated that other embodiments may differ in one or more manners from these example embodiments.

A data Hamiltonian may be implemented as a function that captures the flow and interdependence of a data domain, and may have three types of variables (e.g., state variables, flow variables, and decision or control variables). A CDI control agent may be implemented as an optimization-based engine operating in a data domain that belongs to a multi-data domain, with agent optimization functionality encoded in the agent's Hamiltonian to use a formal, distributed rule-based process for resolving time-based queries from a distributed agent-based domain in real-time. A CDI control agent of the CDD system may be implemented using Horn clause rules of three types, as follows: absolute rules that characterize the physics of a physical target system being controlled (or otherwise describe unchangeable rules in other types of target systems), and have truth value equal to true in any Hamiltonian realization (e.g., a value of 0 for false or 1 for true); hard rules that characterize the desired behavior and goals, and have truth value equal to true in any Hamiltonian realization (e.g., a value of 0 for false or 1 for true); and soft rules that characterize the empirical knowledge of the operation, heuristic strategies, economic dispatch, and response to anomalies and learning strategies, and have a variable, probabilistic truth value in [0,1], as well as an associated confidence value for that variable, probabilistic truth value in some embodiments. Meta-rules that are special kinds of soft rules may be used to transform sensory data and desired behavior into constraint data Hamiltonians. Soft rules can be thought of as being used to navigate queries through "gradients" (information that is neither true nor false), as a means of identifying what areas of data are pertinent to any given query. Conversion of constraints for a CDI control agent may include the following: transform truth values $\{0,1\}$ to a $[0,1]$ interval; transform variables and parameters to continuous variables and parameters; transform absolute rules to equality constraints; transform hard rules to equality constraints; transform soft rules to inequality constraints; transform inclusion sets to functional forms; transform algorithms to differential equations; etc.

Some further aspects of implementing such techniques for modeling target systems and performing automated operations to control such target systems, including in a distributed manner using multiple agents, are included in U.S. patent application Ser. No. 14/746,738, filed Jun. 22, 2015 and entitled "Cooperative Distributed Control Of Target Systems;" in U.S. Patent Application No. 62/182,968, filed Jun. 22, 2015 and entitled "Applications Of Cooperative Distributed Control Of Target Systems;" in U.S. Patent Application No. 62/182,796, filed Jun. 22, 2015 and entitled "Gauge Systems;" and in international PCT Patent Application No. PCT/US2015/037022, filed Jun. 22, 2015 and entitled "Cooperative Distributed Control Of Target Systems," each of which is hereby incorporated by reference in its entirety.

FIG. 2B continues the example of FIG. 2A, and provides additional details 200B about operations of the control action manager component discussed with respect to FIG. 2A. FIG. 2B illustrates control system 205a, which includes a control action manager component such as component 205c, although that component is not illustrated in FIG. 2B—while other components of FIG. 2A are similarly not illustrated in FIG. 2B (e.g., battery 205b, FET amplifier actuator 205e, sensors 205d, etc., such components may similarly be present. FIG. 2B further illustrates a domain 210a that represents a set of possible control actions and the response trajectories of the battery 205b, such as to correspond to the control space over which the control action manager component improves a corresponding distribution function. The control system and its control action manager component use the described techniques to automatically propagate changes in behavior of the battery system being controlled over time via impedance level control values determined and implemented for an actuator associated with the battery. In particular, the control system 205a may perform one or more control actions 215 in the domain 210a, such as control actions 215a and 215b at times $T_0$ and $T_1$, respectively, resulting in corresponding battery operation trajectories 220 such as 220a and 220b, respectively. Other similar control actions 215c and battery operation trajectories 220c are similarly illustrated.

As previously noted, the battery 205b may be modeled with a Hamiltonian function that includes operational constraints reflected in the domain 210a, and the control action manager component 205c applies the described techniques to determine impedance level control values and corresponding control actions in which the constraints are satisfied and sensor information from the battery (e.g., voltage and current) is compatible with the operational constraints. In at least some embodiments and situations, a completely optimal series of determined impedance levels may not be reached, but the control action manager component nevertheless improves functionality of the control system by increasing desired results (e.g., battery life, lack of energy dissipation, etc.). Thus, rules for a control system agent may be used to define constraints for a data Hamiltonian for the agent, and converted to a constraint optimization problem that a corresponding CDD system addresses, with the control action manager component improving control system functionality during use without one or more defined criteria to optimize by instead repeatedly improving a distribution function over the control space and its resulting determined control actions to use in particular situations.

FIG. 2C continues the examples of FIGS. 2A and 2B, and illustrates further details 200C regarding components that may be used as part of a battery system. In particular, FIG. 2C includes the control system 205a (including a control action manager component, not shown), battery 205b and sensors 205d of FIG. 2A, but does not illustrate other elements of FIG. 2A, although such elements may similarly be present in the system of FIG. 2C. FIG. 2C further illustrates that the actuator 205e in this example is an 8-switch-level MOSFET (metal-oxide-semiconductor field-effect transistor) actuator (high frequency), which sets one of 8 corresponding levels in impedance actuator module 240e in response to a control signal from the control system 205a sent via an intermediary digital-to-analog (DAC) connector 240b. The module 240e is in series with the battery 205b, a time-variable load 240d, and a grid power current source 240c. The sensors 205d provide feedback to the control system 205a via an analog-to-digital (ADC) connector 240a.

In the example of FIG. 2C, the control system operates to satisfy the demand from the time-variable load with a combination of the grid current source and the battery, with the battery power out being limited at times by the control system to achieve quality longevity. The control system selects one of the 8 impedance level control values for the actuator 205e and module 240e for each time period interval [nΔ, (n+1)Δ] based on the use of the described parametric linear approximation techniques for a non-linear control space described herein. Such techniques are used to select one of multiple enumerated possible control values (referred to at times herein as performing 'chattering') and associated control actions, in contrast to other types of linear approximations of non-linear spaces that do not have such defined enumerated possible control values.

As one non-exclusive example of the described techniques, the control action manager component may determine a particular impedance level $u_{1-8}$ control value at a particular time according to the table shown below, as part of a corresponding determined control action to charge or discharge the battery using that determined impedance level.

|  | Current Level | Current Change Rate Level | Control Value |
|---|---|---|---|
| Charge | Low | Low | $u_1$ |
|  | Low | High | $u_2$ |
|  | High | Low | $u_3$ |
|  | High | High | $u_4$ |
| Discharge | Low | Low | $u_5$ |
|  | Low | High | $u_6$ |
|  | High | Low | $u_7$ |
|  | High | High | $u_8$ |

In this example, each time period Δ is 0.25 seconds, the 8 impedance level control values range from 16 ohms to 1.5 ohms (e.g., $u_1$ is 16 ohms, $u_2$ is 14 ohms, $u_3$ is 12 ohms, $u_4$ is 10 ohms, $u_5$ is 4 ohms, $u_6$ is 3 ohms, $u_7$ is 2 ohms, and $u_8$ is 1.5 ohms) and an 8-level operational amplifier for current rate is implemented with MOSFET transistors, "high" current corresponds to the lowest resistor level, "low" current corresponds to the highest resistor level, "high" current change rate level corresponds to the highest feedback level of the operational amplifier, "low" current change rate level corresponds to the lowest feedback level of the operational amplifier, and the determined control action includes whether to "charge" or "discharge" the battery according to one of the 8 impedance levels as indicated (with 4 impedance levels corresponding to "charge" and 4 to "discharge" in this example). It will be appreciated that other values and types of components may be used in other embodiments, including with more or less than 8 impedance levels.

As one example of further details for use in implementing functionality of a control action manager component in some embodiments, the dynamics of a target system is represented by vector differential equation in which the control variables are continuous signals as follows:

$$\dot{x}(t) = f(x(t), u(t)) \quad (1)$$

where x(t) is a vector on $R^n$ for every time t and the initial condition x(0) is known, $u(t) \subseteq U \subseteq R^m$ is a vector, n>m for every t measurable almost everywhere, n represents the number of different internal dynamics/state variables (or variable values), m represents the number of possible control actions (also referred to as $s_n$ below in a particular example for a particular $n^{th}$ time interval), $R^m$ is the collection of all m-dimensional tuples of real numbers, U represents the possible control vectors that are valid for every time (which will be a subset of $R^m$ unless all control vectors are possible at that time), and f(•) is a bounded and continuous function of x(t) and u(t). The vector x(t), which is a n-dimensional vector in $R^n$, represents the internal dynamics of the device under control. Vector u(t), which is a m-dimensional vector in $R^m$, is the control signal vector. Each entry of the vector u(t) represents the particular action that can be done to affect the system behavior. Not all the possible vectors in $R^m$ are valid at each time t, only the elements of $R^m$ that are also members of U are valid at each time t (i.e. U is a subset of $R^m$).

A process is implemented to design a distribution function $\alpha_u(t)$, $0 \leq \alpha_u(t) \leq 1$, that measures the distribution of the values of the control vector u(t) at time t, and $u(t) \subseteq U$. The distribution $\alpha_u(t)$ is chosen to optimize a given criterion of the form $$\min_{u(t)} \int_0^T L(x(t), u(t)) dt$$

which can be expressed in terms of the distribution $\alpha(t)$ as follows $$\min_{\alpha_u(t)} \int_0^T \int_U L(x(t), u) d\alpha_u(t) dt \quad (1)$$

$$s.t. \int_U d\alpha_u(t) = 1 \text{ for all } t$$

In terms of $\alpha_u(t)$, the dynamics can be written as $$x(t+\Delta) = x(t) + \int_t^{t+\Delta} \int_U f(x(\tau), u) d\alpha_u(\tau) d\tau \quad (2)$$

where Δ is a sample time.

The optimization problem over the distribution $\alpha_u(t)$ can be approximated by an algorithm for solving the optimization that takes into account of inner integrals of both (1) and (2) being Lebesgue integrals. The approximation process is constructed by the following steps:

(1) For each t, approximate the continuous values of u(τ) for τ between [t, t+Δ] with discrete sequence $74 < u_1 < u_2 < \ldots < u_s^t$, $u_i^t \subseteq R^m$.

(2) Choose Δ to be sufficiently small so that both integrals (1) and (2) can be approximated by summations in which the variable x remains constant over each interval [t, t+Δ]

$$\min_{\{\alpha_i^{(n)}\}_{\substack{i=1,2,\ldots,s_n \\ n=0,1,\ldots,N}}} \sum_{n=0}^{N-1} \sum_{i=1}^{s_n} L(x(n\Delta), u_i^{(n)}) * \alpha_i^{(n)} * \Delta \text{ s.t. } \sum_{i=1}^{s_n} \alpha_i^{(n)} = \quad (3)$$

1 for all $n = 0, 1, \ldots, N-1$ and $$x((n+1)\Delta) = \quad (4)$$

$$x(n\Delta) + \sum_{i=1}^{s_n} f(x(n\Delta), u_i^{(n)}) * \alpha_i^{(n)} * \Delta \text{ for all } n = 0, 1, \ldots, N-1$$

where N*Δ is the horizon of the optimization, n*Δ is the lower boundary of the $n^{th}$ time interval, and $s_n$ is the number of control levels in the $n^{th}$ time interval.

(3) The approximations (3) and (4) have accuracy of the order of ($\rightarrow^2$*error), where error is the maximum of error due to control sampling.

(4) Two tolerance thresholds are defined: $\epsilon$ for the error in the state, and $\phi$ for the optimization error.

An example implementation of the process uses a parametric linear approximation that operates as follows:

Step 1. Set iteration number l=0; for n=0, 1, ..., N−1, and for each i=1, 2, ... $s_n$, assume that $\alpha_i^{(n,l)}$ is a uniform distribution.

Step 2. Propagate the following equation to obtain $\hat{x}^{(l)}$ (n$\Delta$) for n=1, ..., N, $$\hat{x}^{(l)}((n+1)\Delta) = \hat{x}^{(l)}(n\Delta) + \sum_{i=1}^{s_n} f(\hat{x}^{(l)}(n\Delta), u_i^{(n)}) * \alpha_i^{(n,l)} * \Delta$$

with $\hat{x}^{(l)}(0) = x_0$

Step 3. Solve the following linear program for improved $\alpha_i^{(n,l+1)}$ $$\min_{\substack{\{\alpha_i^{(n)}\} \\ i=1,2,\ldots,s_n \\ n=0,1,\ldots,N}} \sum_{n=0}^{N-1} \sum_{i=1}^{s_n} L(\hat{x}^{(l)}(n\Delta), u_i^{(n)}) * \alpha_i^{(n,l+1)} * \Delta \text{ s.t. } \sum_{i=1}^{s_n} \alpha_i^{(n,l+1)} = 1 \text{ for all } n = 0, 1, \ldots, N-1$$

Step 4. Propagate the following equation to obtain $\hat{x}^{(l+1)}$(n$\Delta$) for n=1, ..., N, $$\hat{x}^{(l+1)}((n+1)\Delta) = \hat{x}^{(l+1)}(n\Delta) + \sum_{i=1}^{s_n} f(\hat{x}^{(l+1)}(n\Delta), u_i^{(n)}) * \alpha_i^{(n,l+1)} * \Delta$$

with $\hat{x}^{(l+1)}(0) = x_0$

Step 5. Compute tolerances:

$$\text{state\_tolerance} = \sum_{n=1}^{N} \|\hat{x}^{(l+1)}(n\Delta) - \hat{x}^{(l)}(n\Delta)\| / N$$

$$\text{optimization\_tolerance} = \left| \sum_{n=0}^{N-1} \sum_{i=1}^{s_n} L(\hat{x}^{(l+1)}(n\Delta), u_i^{(n)}) * \alpha_i^{(n,l+1)} * \Delta - \sum_{n=0}^{N-1} \sum_{i=1}^{s_n} L(\hat{x}^{(l)}(n\Delta), u_i^{(n)}) * \alpha_i^{(n,l)} * \Delta \right|$$

Step 6. If state_tolerance<$\epsilon$ and optimization_tolerance<$\phi$, stop; otherwise, set l←l+1, and go back to Step 3.

The parametric linear programming above converges if, for the given tolerances, L and f are Leqesque integrable, U is compact, and the levels are well ordered for each time interval.

It will also be appreciated that the examples of FIGS. 2A-2C are provided for illustrative purposes and are simplified for the sake of brevity, and the inventive techniques may be used in a wide variety of other situations, including in other environments and with other types of automated control action determination techniques (e.g., target systems that do not include batteries, or in which any batteries are not the elements being controlled by the control system), some of which are discussed below. As one non-exclusive example, the control system may be performing an automated analysis of data generated by and/or received by a target system, such as in an attempt to identify anomalies with a sufficiently low degree of uncertainty (e.g., to analyze mammograph images to detect anomalies in comparison to other known-good mammograph images lacking non-normal tissue; such as to identify non-normal tissue; to analyze other types of images for differences from known-good samples; to analyze computer network traffic for differences from example network traffic that lacks problems, such as to determine problems with excess latency, excess bandwidth usage, etc.; to analyze computer system files and/or downloads and/or memory and/or storage for differences from known-good samples, such as to detect malware; etc.)—if so, the control action manager component may determine control actions to minimize or otherwise reduce anomalies and/or associated uncertainty. In such situations in which a target system is involved with cyber-security for one or more computing devices (e.g., to minimize malware in incoming communications or to otherwise minimize security threats of one or more defined types), an 'anomaly' may correspond to a communication that is part of a malware attempt/attack, or more generally to a security threat, and the control actions by the control system include selecting from multiple enumerated actions to prevent or mitigate such security threats (e.g., to block and/or quarantine and/or modify communications corresponding to a security threat, to prevent other types of actions posing security threats, etc.). Each type of anomaly may be represented by a dynamic equation of type (1) discussed above, with the criterion equation representing entropy of the anomaly, and the distribution function acting to minimize that entropy so as to improve the probability of detecting anomalies of the defined type(s). As another non-exclusive example, the target system may include a motor and the control system may control when and how the motor is used (e.g., to move an electrical vehicle or other type of powered vehicle, adjust valves or openings in physical systems, etc.)—if so, the control action manager component may minimize or otherwise reduce excess torque or other wasted use of the motor, such as by selecting from multiple enumerated control values for a control system actuator that regulates the output of the motor (e.g., a transmission or gear system), etc. As another non-exclusive example, the target system may include one or more super-capacitor electrical devices and the control system may control when and/or how and/or how much power is supplied to and/or from the super-capacitor(s) (e.g., to supplement batteries in use, such as batteries being used to power trains or subways or automobiles or bicycles or airplanes or drones or other vehicles, by using dynamic braking to store power and by reducing the power load on the batteries at time of vehicle acceleration or other times of high power demand, etc.)—if so, the control system manager component may minimize or otherwise reduce power dissipation and/or excess use of the batteries beyond a defined threshold, such as by selecting from multiple enumerated control values for a control system actuator that regulates the input to and/or output of the super-capacitor(s). As another non-exclusive example, the control system may be controlling a target system having an electrical device that performs computing functionality (e.g., a computer device or system) and generates data (e.g., network communications, data to be stored, etc.), such as in an attempt to regulate network traffic that is sent (e.g., to prevent problems of one or more defined types, such as with network latency, bandwidth usage, dropped packets, etc.) or to regulate usage of storage space and capabilities (e.g., to prevent storage bottlenecks, excess device usage, etc.)—if so, the control system manager component may minimize or otherwise reduce network traffic or other generated data that is outside a defined range and/or has problems of any of one or more defined types, such as by selecting from multiple enumerated control values for a control system actuator that regulates an amount and/or timing of network traffic sent and/or data stored, etc.

Figure 3:
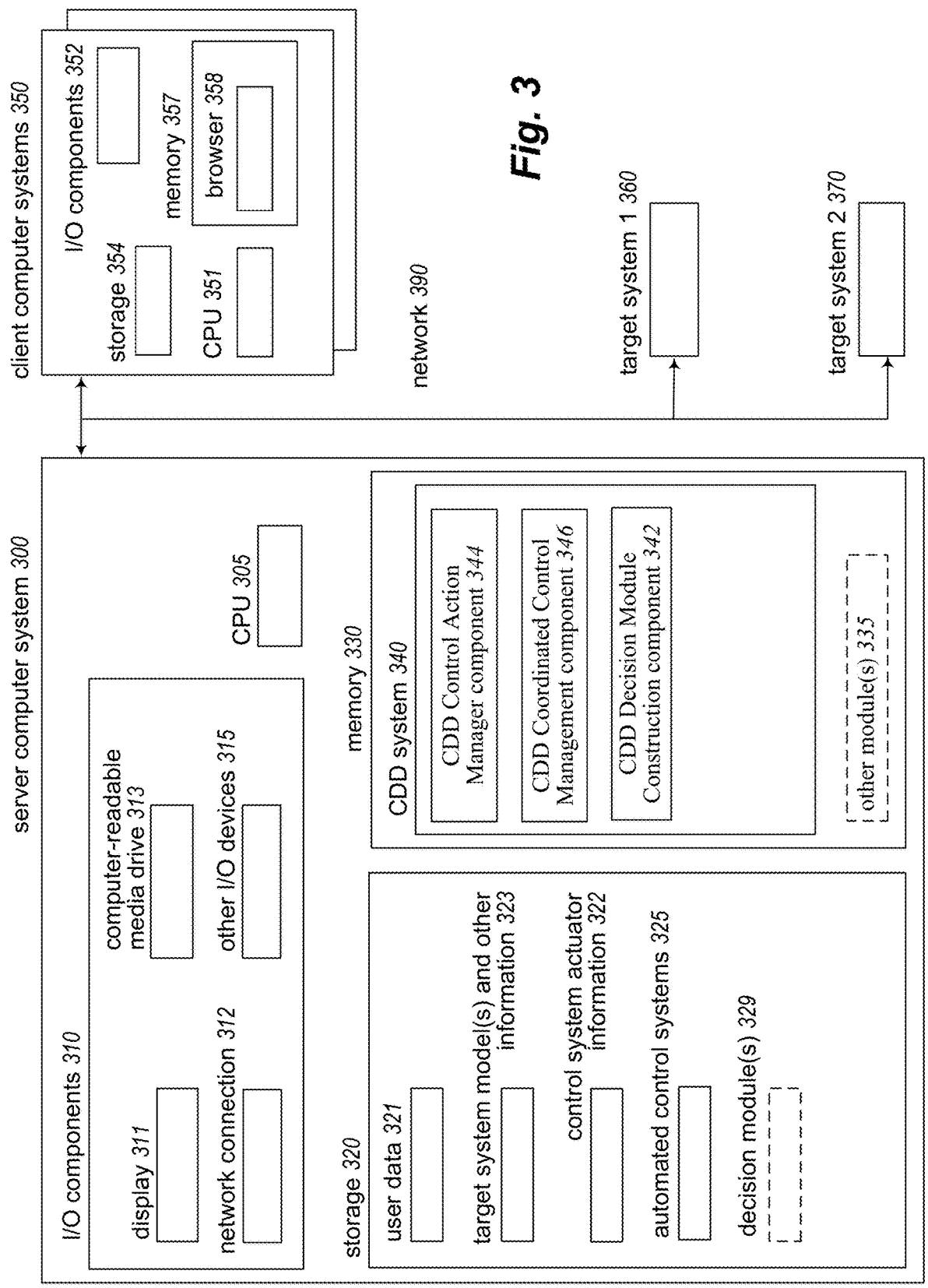
FIG. 3 is a block diagram illustrating example computing systems suitable for executing an embodiment of a system for performing cooperative distributed control of target systems in configured manners, including one or more components to automatically and repeatedly determine and implement control actions for one or more target systems.

FIG. 3 is a block diagram illustrating example computing systems suitable for performing techniques for implementing automated control systems to control or otherwise manipulate at least some operations of specified physical systems or other target systems, including using one or more control state manager components for repeatedly and automatically modifying control components in the target systems, as discussed in greater detail elsewhere herein. In particular, FIG. 3 illustrates a server computing system 300 suitable for providing at least some functionality of a CDD system including a control action manager component and other components, various client computer systems 350 that may be used by customers or other users of the CDD system 340, and one or more target systems to be controlled (in this example, target system 1 360 and target system 2 370, which are accessible to the CDD system 340 and its control state manager components 345 over one or more computer networks 390, although in other embodiments the control state manager components and/or other CDD components may execute local to a target system that they are controlling). In other embodiments, multiple computing systems may be used for the execution of a CDD system (e.g., to have one or more computing systems executing a CDD Decision Module Construction component for initial configuration and setup before run-time control occurs, and one or more other computing systems performing run-time control by executing one or more copies of the CDD Control Action Manager component 344 and/or the CDD Coordinated Control Management component 346; to have one or more computing systems executing a control action manager component that are separate from one or more other computing systems executing some or all other components of a CDD system with which the control action manager component interacts; to have different computing systems executing different control action manager components; etc.).

In the illustrated embodiment, the Control Action Manager component 344 is in memory 330 as part of the executing CDD system 340, and in some embodiments the component includes various software instructions that when executed program one or more of the hardware CPU processors 305 to provide an embodiment of a control state manager component as described elsewhere herein. During operation, in at least some embodiments, a control system decision module with a control action manager component may obtain various input data (not shown) regarding an associated target system (e.g., from one or more sensors), and modify one or more target system state models (e.g., models 323 stored on storage 320) that are in use to control the target system, such as by determining adjustments to control system actuator information 322 used by one or more control system actuators regulating batteries or other elements of the target system as well as exchange various information with other executing components, as discussed in greater detail elsewhere herein.

The server computing system 300 has components in the illustrated embodiment that include one or more hardware CPU ("central processing unit") computer processors 305, various I/O ("input/output") hardware components 310, storage 320, and memory 330. The illustrated I/O components include a display 311, a network connection 312, a computer-readable media drive 313, and other I/O devices 315 (e.g., a keyboard, a mouse, speakers, etc.). In addition, the illustrated client computer systems 350 may each have components similar to those of server computing system 300, including one or more hardware CPUs 351, I/O components 352, storage 354, and memory 357, although some details are not illustrated for the computing systems 350 for the sake of brevity. The target systems 360 and 370 may also each include one or more computing systems (not shown) having components that are similar to some or all of the components illustrated with respect to server computing system 300, including to optionally locally execute one or more CDD components, but such computing systems and components are also not illustrated in this example for the sake of brevity.

The CDD system 340 is executing in memory 330 and includes components 342-346, and in some embodiments the system and/or components each includes various software instructions that when executed program one or more of the CPU processors 305 to provide an embodiment of a CDD system as described elsewhere herein. The CDD system 340 may interact with computing systems 350 over the network 390 (e.g., via the Internet and/or the World Wide Web, via a private cellular network, etc.), as well as the target systems 360 and 370 in this example. In this example embodiment, the CDD system includes functionality related to generating and deploying decision modules in configured manners for customers or other users, as discussed in greater detail elsewhere herein, as well as generating or deploying control state manager components 344 at runtime, such as part of associated control system decision modules, to improve functionality of the control systems in controlling corresponding target systems. The other computing systems 350 may also be executing various software as part of interactions with the CDD system 340 and/or its components. For example, client computing systems 350 may be executing software in memory 357 to interact with CDD system 340 (e.g., as part of a Web browser, a specialized client-side application program, etc.), such as to interact with one or more interfaces (not shown) of the CDD system 340 to configure and deploy automated control systems (e.g., stored automated control systems 325 that were previously created by the CDD system 340 for use in controlling one or more physical target systems) or other decision modules 329, as well as to perform various other types of actions, as discussed in greater detail elsewhere. Various information related to the functionality of the CDD system 340 may be stored in storage 320, such as information 321 related to users of the CDD system (e.g., account information), and information 323 related to one or more target systems (e.g., systems that have batteries to be controlled), including models that have been generated of particular target systems (e.g., target systems 1 and 2) and are optionally in use by an associated CDD control system.

It will be appreciated that computing systems 300 and 350 and target systems 360 and 370 are merely illustrative and are not intended to limit the scope of the present invention. The computing systems may instead each include multiple interacting computing systems or devices, and the computing systems/nodes may be connected to other devices that are not illustrated, including through one or more networks such as the Internet, via the Web, or via private networks (e.g., mobile communication networks, etc.). More generally, a computing node or other computing system or device may comprise any combination of hardware that may interact and perform the described types of functionality, including without limitation desktop or other computers, database servers, network storage devices and other network devices, PDAs, cell phones, wireless phones, pagers, electronic organizers, Internet appliances, television-based systems (e.g., using set-top boxes and/or personal/digital video recorders), and various other consumer products that include appropriate communication capabilities. In addition, the functionality provided by the illustrated CDD system 340 and its components may in some embodiments be distributed in additional components. Similarly, in some embodiments some of the functionality of the CDD system 340 and/or CDD components 342-346 may not be provided and/or other additional functionality may be available.

As part of implementing an automated control system for a particular target system, an embodiment of a Collaborative Distributed Decision (CDD) system may use the described techniques to perform various automated activities involved in constructing and implementing the automated control system, including generating one or more CDI agents (also referred to as a CDD decision module or system, or a portion of such module or system) for use as some or all of an automated control system in controlling particular target systems In particular, such an automated control system for a specified target system may, during operation, modify or otherwise manipulate inputs or other control elements of the target system that affect its operation (e.g., affect one or more outputs of the target system). An automated control system for such a target system may in some situations have a distributed architecture that provides cooperative distributed control of the target system, such as with multiple decision modules that each control a portion of the target system and that operate in a partially decoupled manner with respect to each other. If so, the various decision modules' operations for the automated control system may be at least partially synchronized, such as by each reaching a consensus with one or more other decision modules at one or more times, even if a fully synchronized convergence of all decision modules at all times is not guaranteed or achieved.

The CDD system may in some embodiments implement a Decision Module Construction component that interacts with one or more users to obtain a description of a target system, including restrictions related to the various elements of the target system, and one or more goals to be achieved during control of the target system—the Decision Module Construction component then performs various automated actions to generate, test and deploy one or more executable decision modules (also referred to at times as "decision elements" and/or "agents") to use in performing the control of the target system. When the one or more executable decision modules are deployed and executed, the CDD system may further provide various components within or external to the decision modules being executed to manage their control of the target system, such as a Control Action Manager component of each decision module as part of a control system to optimize or otherwise enhance the control actions that the decision module determines and implements, one or more Coordinated Control Management components to coordinate the control actions of multiple decision modules that are collectively performing the control of the target system, and/or one or more other components. The Decision Module Construction component may thus operate as part of a configuration or setup phase that occurs before a later run-time phase in which the generated decision modules are executed to perform control of the target system, although in some embodiments and situations the Decision Module Construction component may be further used after an initial deployment to improve or extend or otherwise modify an automated control system that has one or more decision modules (e.g., while the automated control system continues to be used to control the target system), such as to implement functionality to improve and update a model of a target system being controlled, or to add, remove or modify decision modules for the automated control system.

In some embodiments, some or all automated control systems that are generated and deployed may further provide various components within them for execution during the runtime operation of the automated control system, such as by including such components within decision modules in some embodiments and situations. Such components may include, for example, a Control Action Manager component of each decision module (or of some decision modules) to optimize or otherwise determine and improve the control actions that the decision module determines and implements. For example, such a Control Action Manager component in a decision module may in some embodiments attempt to automatically determine the decision module's control actions for a particular time to reflect a near-optimal solution with respect to or one more goals and in light of a model of the decision module for the target system that has multiple inter-related constraints and based on current state information that is modeled for the target system, including to use parametric linear approximation techniques to do so as discussed elsewhere herein—if so, such a near-optimal solution may be based at least in part on a partially optimized solution that is within a threshold amount of a fully optimized solution. Such determination of one or more control actions to perform may occur for a particular time and for each of one or more decision modules, as well as be repeated over multiple times for ongoing control by at least some decision modules in some situations. In some embodiments, the model for a decision module is implemented as a Hamiltonian function that reflects a set of coupled differential equations based in part on constraints representing at least part of the target system, such as to allow the model and its Hamiltonian function implementation to be updated over multiple time periods by adding additional expressions within the evolving Hamiltonian function, as discussed in greater detail elsewhere herein.

In some embodiments, the components included within a generated and deployed automated control system for execution during the automated control system's runtime operation may further include one or more Coordinated Control Management components to coordinate the control actions of multiple decision modules that are collectively performing the control of a target system for the automated control system. For example, some or all decision modules may each include such a Coordinated Control Management component in some embodiments to attempt to synchronize that decision module's local solutions and proposed control actions with those of one or more other decision modules in the automated control system, such as by determining a consensus shared model with those other decision modules that simultaneously provides solutions from the decision module's local model and the models of the one or more other decision modules. Such inter-module synchronizations may occur repeatedly to determine one or more control actions for each decision module at a particular time, as well as to be repeated over multiple times for ongoing control. In addition, each decision module's model is implemented in some embodiments as a Hamiltonian function that reflects a set of coupled differential equations based in part on constraints representing at least part of the target system, such as to allow each decision module's model and its Hamiltonian function implementation to be combined with the models of one or more other decision modules by adding additional expressions for those other decision modules' models within the initial Hamiltonian function for the local model of the decision module, as discussed in greater detail elsewhere herein.

It will also be appreciated that, while various items are illustrated as being stored in memory or on storage while being used, these items or portions of them may be transferred between memory and other storage devices for purposes of memory management and data integrity. Alternatively, in other embodiments some or all of the software components and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the Control State Manager components 344 and/or other of the CDD components 342-346, or more generally by the CDD system 340) and/or data structures, such as by execution of software instructions of the one or more software programs and/or by storage of such software instructions and/or data structures. Furthermore, in some embodiments, some or all of the systems and/or components may be implemented or provided in other manners, such as by using means that are implemented at least partially or completely in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the components, systems and data structures may also be stored (e.g., as software instructions or structured data) on a non-transitory computer-readable storage medium, such as a hard disk or flash drive or other non-volatile storage device, volatile or non-volatile memory (e.g., RAM), a network storage device, or a portable media article to be read by an appropriate drive (e.g., a DVD disk, a CD disk, an optical disk, etc.) or via an appropriate connection. The systems, components and data structures may also in some embodiments be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 4:
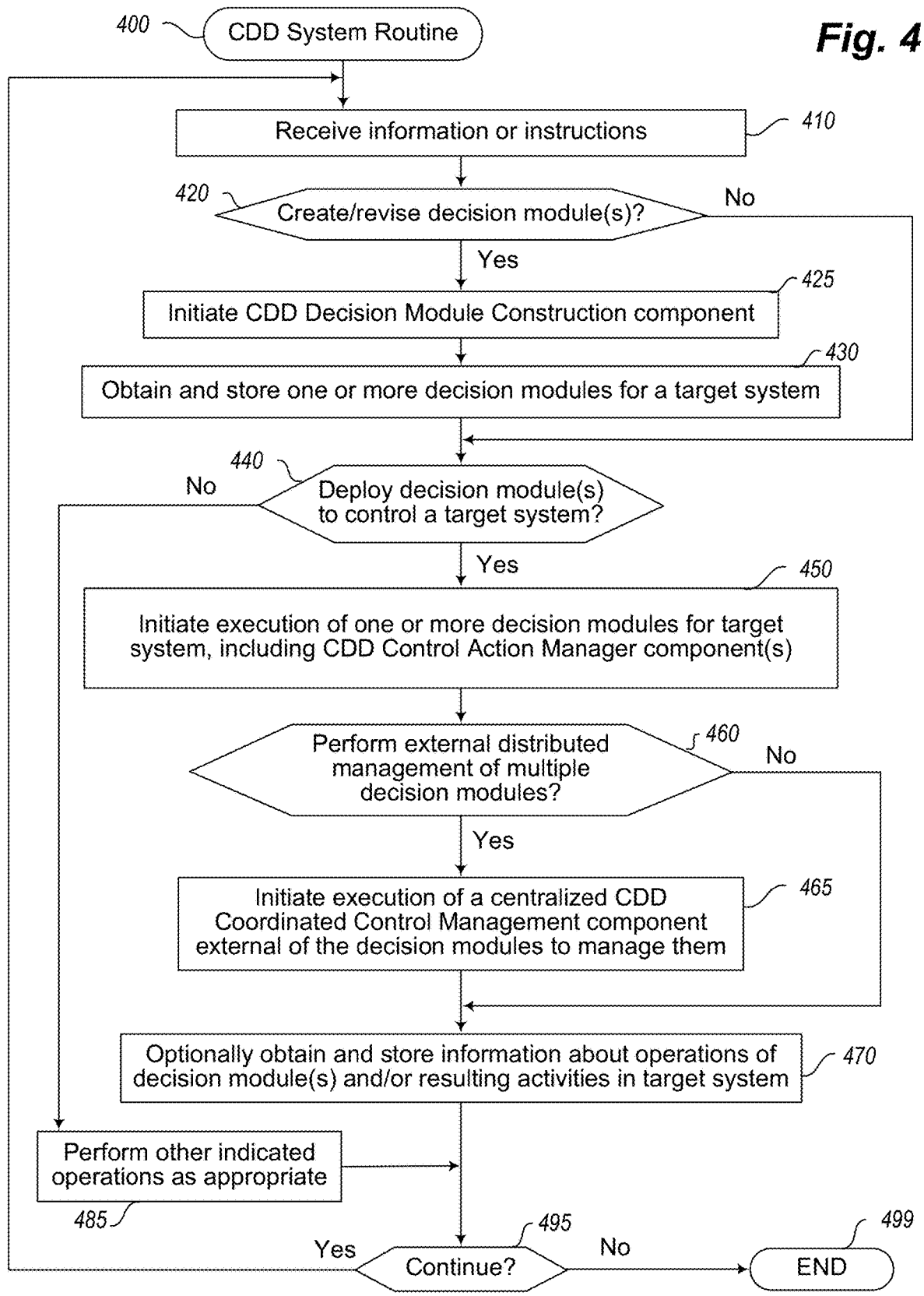
FIG. 4 illustrates a flow diagram of an example embodiment of a Collaborative Distributed Decision (CDD) System routine.

FIG. 4 is a flow diagram of an example embodiment of a Collaborative Distributed Decision (CDD) system routine 400. The routine may, for example, be provided by execution of the CDD system 340 of FIG. 3 and/or the CDD system 140 of FIG. 1B, such as to provide functionality to construct and implement automated control systems for specified target systems.

The illustrated embodiment of the routine begins at block 410, where information or instructions are received. If it is determined in block 420 that the information or instructions of block 410 include an indication to create or revise one or more decision modules for use as part of an automated control system for a particular target system, the routine continues to block 425 to initiate execution of a Decision Module Construction component, and in block 430 obtains and stores one or more resulting decision modules for the target system that are created in block 425. One example of a routine for such a Decision Module Construction component is discussed in greater detail with respect to FIGS. 5A-5B.

After block 430, or if it is instead determined in block 420 that the information or instructions received in block 410 are not to create or revise one or more decision modules, the routine continues to block 440 to determine whether the information or instructions received in block 410 indicate to deploy one or more created decision modules to control a specified target system, such as for one or more decision modules that are some or all of an automated control system for that target system. The one or more decision modules to deploy may have been created immediately prior with respect to block 425, such that the deployment occurs in a manner that is substantially simultaneous with the creation, or in other situations may include one or more decision modules that were created at a previous time and stored for later use. If it is determined to deploy one or more such decision modules for such a target system, the routine continues to block 450 to initiate the execution of those one or more decision modules for that target system, such as on one or more computing systems local to an environment of the target system, or instead on one or more remote computing systems that communicate with the target system over one or more intermediary computer networks (e.g., one or more computing systems under control of a provider of the CDD system). The execution of some or all such decision modules may further include executing an associated control action manager component to improve functionality of the decision modules and their control system during operation, with FIG. 7 providing an example of a routine for execution of a control action manager component.

After block 450, the routine continues to block 460 to determine whether to perform distributed management of multiple decision modules being deployed in a manner external to those decision modules, such as via one or more centralized Coordinated Control Management components. If so, the routine continues to block 465 to initiate execution of one or more such centralized CDD Coordinated Control Management components for use with those decision modules. After block 465, or if it is instead determined in block 460 to not perform such distributed management in an external manner (e.g., if only one decision module is executed, if multiple decision modules are executed but coordinate their operations in a distributed peer-to-peer manner via local CDD Coordinated Control Management components, etc.), the routine continues to block 470 to optionally obtain and store information about the operations of the one or more decision modules and/or resulting activities that occur in the target system, such as for later analysis and/or reporting.

If it is instead determined in block 440 that the information or instructions received in block 410 are not to deploy one or more decision modules, the routine continues instead to block 485 to perform one or more other indicated operations if appropriate. For example, such other authorized operations may include obtaining results information about the operation of a target system in other manners (e.g., by monitoring outputs or other state information for the target system), analyzing results of operations of decision modules and/or activities of corresponding target systems, generating reports or otherwise providing information to users regarding such operations and/or activities, etc. In addition, in some embodiments the analysis of activities of a particular target system over time may allow patterns to be identified in operation of the target system, such as to allow a model of that target system to be modified accordingly (whether manually or in an automated learning manner) to reflect those patterns and to respond based on them. In addition, as discussed in greater detail elsewhere, distributed operation of multiple decision modules for an automated control system in a partially decoupled manner allows various changes to be made while the automated control system is in operation, such as to add one or more new decision modules, to remove one or more existing decision modules, to modify the operation of a particular decision module (e.g., by changing rules or other information describing the target system that is part of a model for the decision module), etc. In addition, the partially decoupled nature of multiple such decision modules in an automated control system allows one or more such decision modules to operate individually at times, such as if network communication issues or other problems prevent communication between multiple decision modules that would otherwise allow their individualized control actions to be coordinated—in such situations, some or all such decision modules may continue to operate in an individualized manner, such as to provide useful ongoing control operations for a target system even if optimal or near-optimal solutions cannot be identified from coordination and synchronization between a group of multiple decision modules that collectively provide the automated control system for the target system.

After blocks 470 or 485, the routine continues to block 495 to determine whether to continue, such as until an explicit indication to terminate is received. If it is determined to continue, the routine returns to block 410, and otherwise continues to block 499 and ends.

Figure 5A:
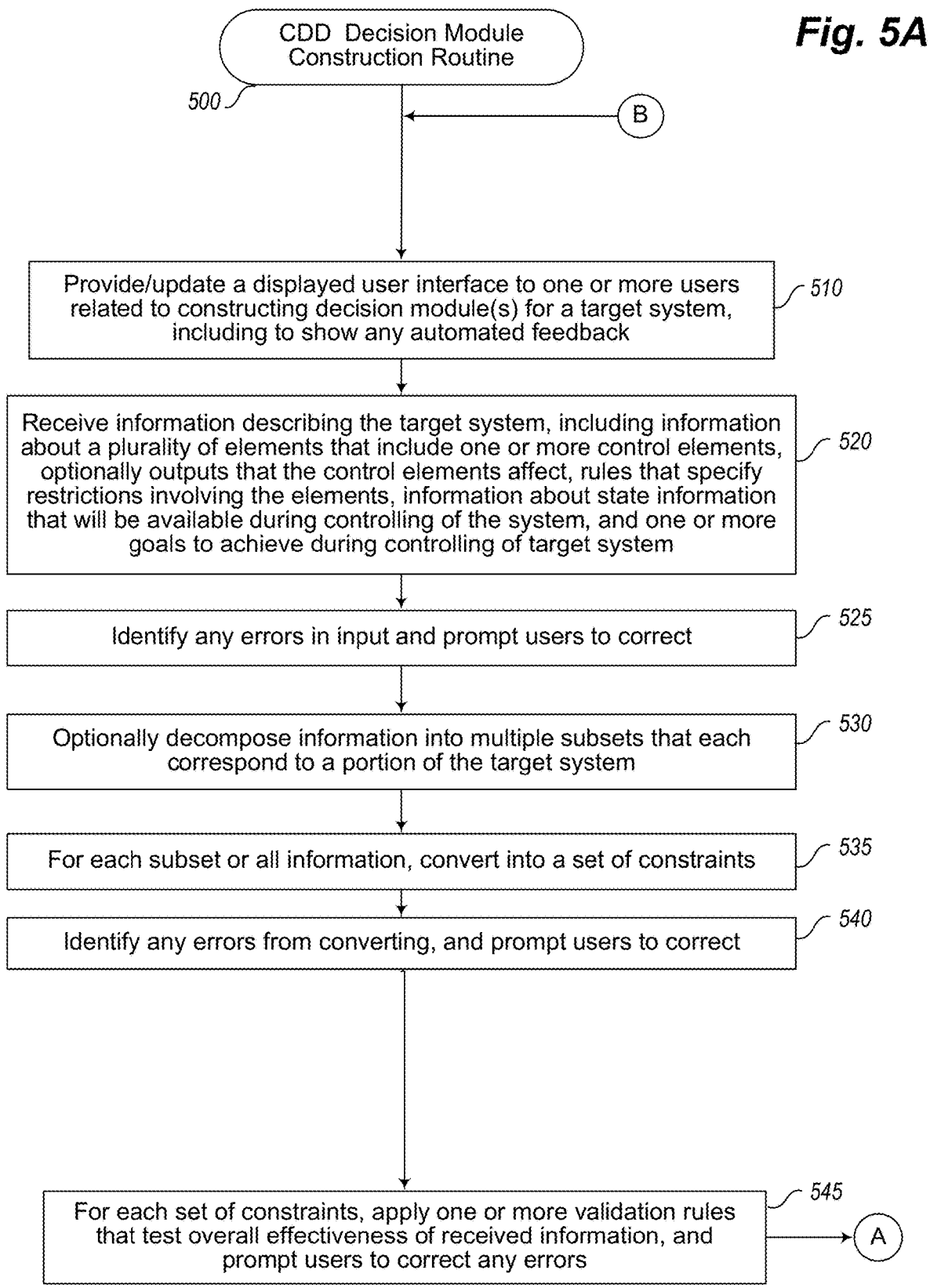
FIGS. 5A-5B illustrate a flow diagram of an example embodiment of a CDD Decision Module Construction routine.
Figure 5B:
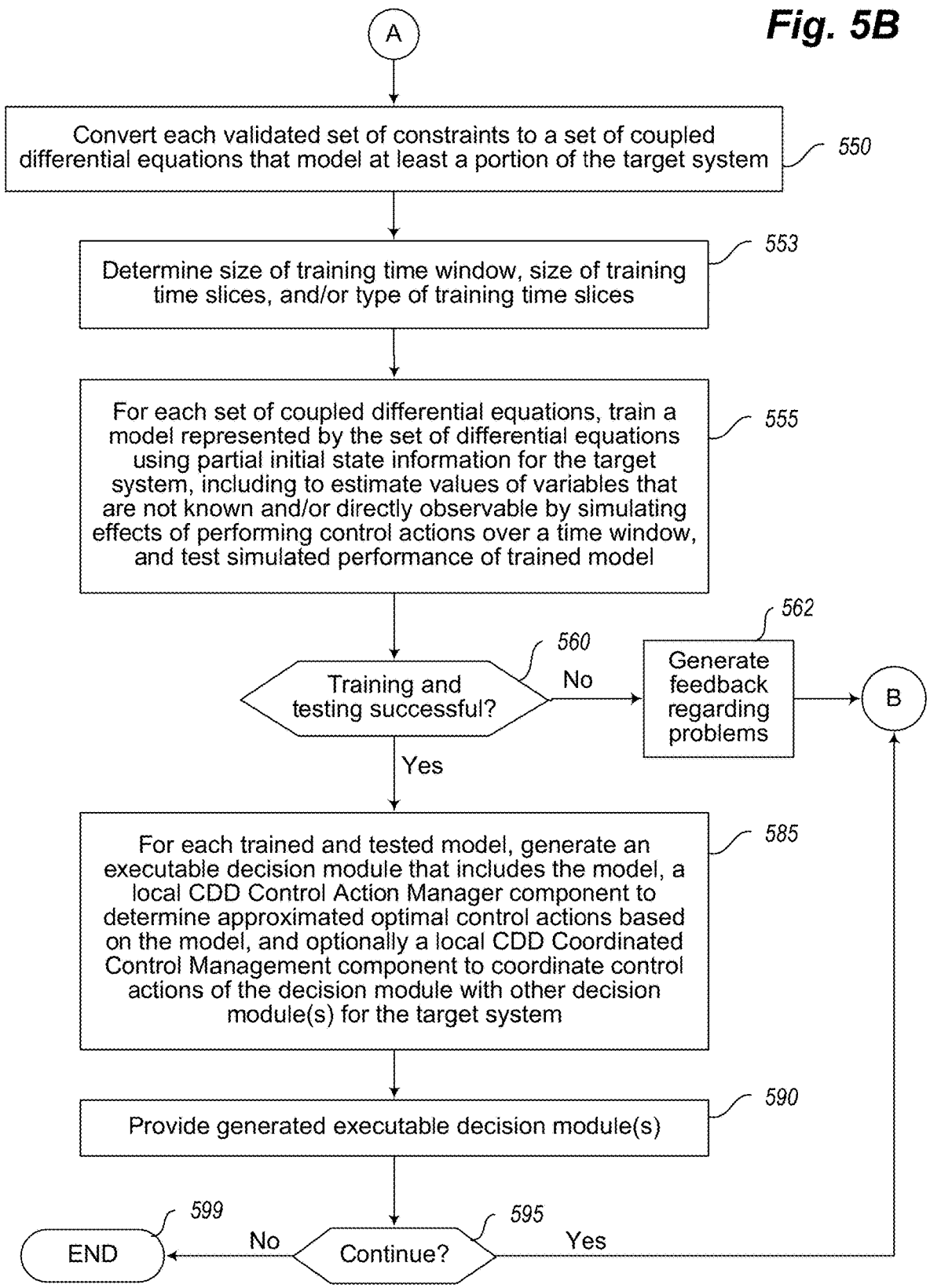

FIGS. 5A-5B illustrate a flow diagram of an example embodiment of a CDD Decision Module Construction routine 500. The routine may, for example, be provided by execution of the component 342 of FIG. 3 and/or the component 142 of FIG. 1B, such as to provide functionality to allow users to provide information describing a target system of interest, and to perform corresponding automated operations to construct one or more decision modules to use to control the target system in specified manners. While the illustrated embodiment of the routine interacts with users in particular manners, such as via a displayed GUI (graphical user interface), it will be appreciated that other embodiments of the routine may interact with users in other manners, such as via a defined API (application programming interface) that an executing program invokes on behalf of a user. In some embodiments, the routine may further be implemented as part of an integrated development environment or other software tool that is available for one or more users to use, such as by implementing an online interface that is available to a variety of remote users over a public network such as the Internet, while in other embodiments a copy of the CDD system and/or particular CDD components may be used to support a single organization or other group of one or more users, such as by being executed on computing systems under the control of the organization or group. In addition, the CDD Decision Module Construction component may in some embodiments and situations be separated into multiple sub-components, such as a rules editor component that users interact with to specify rules and other description information for a target system, and a rules compiler engine that processes the user-specified rules and other information to create one or more corresponding decision modules.

The illustrated embodiment of the routine 500 begins at block 510, where the routine provides or updates a displayed user interface to one or more users, such as via a request received at an online version of component that is implementing the routine, or instead based on the routine being executed by one or more such users on computing systems that they control. While various operations are shown in the illustrated embodiment of the routine as occurring in a serial manner for the purpose of illustration, it will be appreciated that user interactions with such a user interface may occur in an iterative manner and/or over multiple periods of time and/or user sessions, including to update a user interface previously displayed to a user in various manners (e.g., to reflect a user action, to reflect user feedback generated by operation of the routine or from another component, etc.), as discussed further below.

After block 510, the routine continues to block 520 to receive information from one or more such users describing a target system to be controlled, including information about a plurality of elements of the target system that include one or more manipulatable control elements and optionally one or more outputs that the control elements affect, information about rules that specify restrictions involving the elements, information about state information that will be available during controlling of the system (e.g., values of particular elements or other state variables, such as from passive sensors), and one or more goals to achieve during the controlling of the target system. It will be appreciated that such information may be obtained over a period of time from one or more users, including in some embodiments for a first group of one or more users to supply some information related to a target system and for one or more other second groups of users to independently provide other information about the target system, such as to reflect different areas of expertise of the different users and/or different parts of the target system.

After block 520, the routine continues to block 525 to identify any errors that have been received in the user input, and to prompt the user(s) to correct those errors, such as by updating the display in a corresponding manner as discussed with respect to block 510. While the identification of such errors is illustrated as occurring after the receiving of the information in block 520, it will be appreciated that some or all such errors may instead be identified as the users are inputting information into the user interface, such as to identify syntax errors in rules or other information that the users specify. After block 525, the illustrated embodiment of the routine continues to block 530 to optionally decompose the information about the target system into multiple subsets that each correspond to a portion of the target system, such as with each subset having one or more different control elements that are manipulatable by the automated control system being created by the routine, and optionally have overlapping or completely distinct goals and/or sets of rules and other information describing the respective portions of the target system. As discussed in greater detail elsewhere, such decomposition, if performed, may in some situations be performed manually by the users indicating different subgroups of information that they enter, and/or in an automated manner by the routine based on an analysis of the information that has been specified (e.g., based on the size of rules and other descriptive information supplied for a target system, based on inter-relationships between different rules or goals or other information, etc.). In other embodiments, no such decomposition may be performed.

After block 530, the routine continues to block 535 to, for each subset of target system description information (or for all the received information if no such subsets are identified), convert that subset (or all the information) into a set of constraints that encapsulate the restrictions, goals, and other specified information for that subset (or for all the information). In block 540, the routine then identifies any errors that occur from the converting process, and if any are identified, may prompt the user to correct those errors, such as in a manner similar to that described with respect to blocks 525 and 510. While not illustrated in this example, the routine may in some situations in blocks 525 and/or 540 return to block 510 when such errors are identified, to display corresponding feedback to the user(s) and to allow the user(s) to make corrections and re-perform following operations such as those of blocks 520-540. Errors identified in the converting process in block 540 may include, for example, errors related to inconsistent restrictions, such as if the restrictions as a group are impossible to satisfy.

After block 540, the routine continues to block 545 to, for each set of constraints (or a single constraint set if no subsets were identified in block 530), apply one or more validation rules to the set of constraints to test overall effectiveness of the corresponding information that the constraints represent, and to prompt the one or more users to correct any errors that are identified in a manner similar to that with respect to blocks 525, 540 and 510. Such validation rules may test one or more of controllability, observability, stability, and goal completeness, as well as any user-added validation rules, as discussed in greater detail elsewhere. In block 550, the routine then converts each validated set of constraints to a set of coupled differential equations that model at least a portion of the target system to which the underlying information corresponds.

After block 550, the routine continues to block 553 to perform activities related to training a model for each set of coupled differential equations, including to determine one or more of a size of a training time window to use, size of multiple training time slices within the time window, and/or a type of training time slice within the time window. In some embodiments and situations, the determination of one or more such sizes or types of information is performed by using default or pre-specified information, while in other embodiments and situations the users may specify such information, or an automated determination of such information may be performed in one or more manners (e.g., by testing different sizes and evaluating results to find sizes with the best performance). Different types of time slices may include, for example, successions of time slices that overlap or do not overlap, such that the training for a second time slice may be dependent only on results of a first time slice (if they do not overlap) or instead may be based at least in part on updating information already determined for at least some of the first time slice (if they do overlap in part or in whole). After block 553, the routine continues to block 555 to, for each set of coupled differential equations representing a model, train the model for that set of coupled differential equations using partial initial state information determined externally for the target system (e.g., from passive sensors), including to estimate values of variable that are not known and/or directly observable for the target system by simulating effects of performing control actions over the time window, such as for successive time slices throughout the time window, and to test the simulated performance of the trained model. Additional details related to training and testing are included elsewhere herein.

After block 555, the routine continues to block 560 to determine whether the training and testing was successful, and if not continues to block 562 to generate feedback regarding the problems, and then returns to block 510 to display the feedback information to the users to allow them to correct errors that caused the lack of success. If it is instead determined in block 560 that the testing and training were successful, however, the routine continues instead to block 585 to generate an executable decision module for each trained and tested model that includes that model, as well as a local CDD Control Action Manager component that the decision module will use when executed to determine optimal or near-optimal control actions to perform for the target system based on the information included in the model and in light of the one or more goals for that decision module. The generated executable decision module may in some embodiments and situations further include a local CDD Coordinated Control Management component to coordinate control actions of multiple decision modules that collectively will provide an automated control system for the target system, such as by synchronizing respective models of the various decision modules over time. After block 585, the routine continues to block 590 to provide the generated executable decision modules for use, including to optionally store them for later execution and/or deployment.

After block 590, the routine continues to block 595 to determine whether to continue, such as until an explicit indication to terminate or suspend operations is received. If it is determined to continue, the routine returns to block 510, and otherwise continues to block 599 and ends.

Figure 6A:
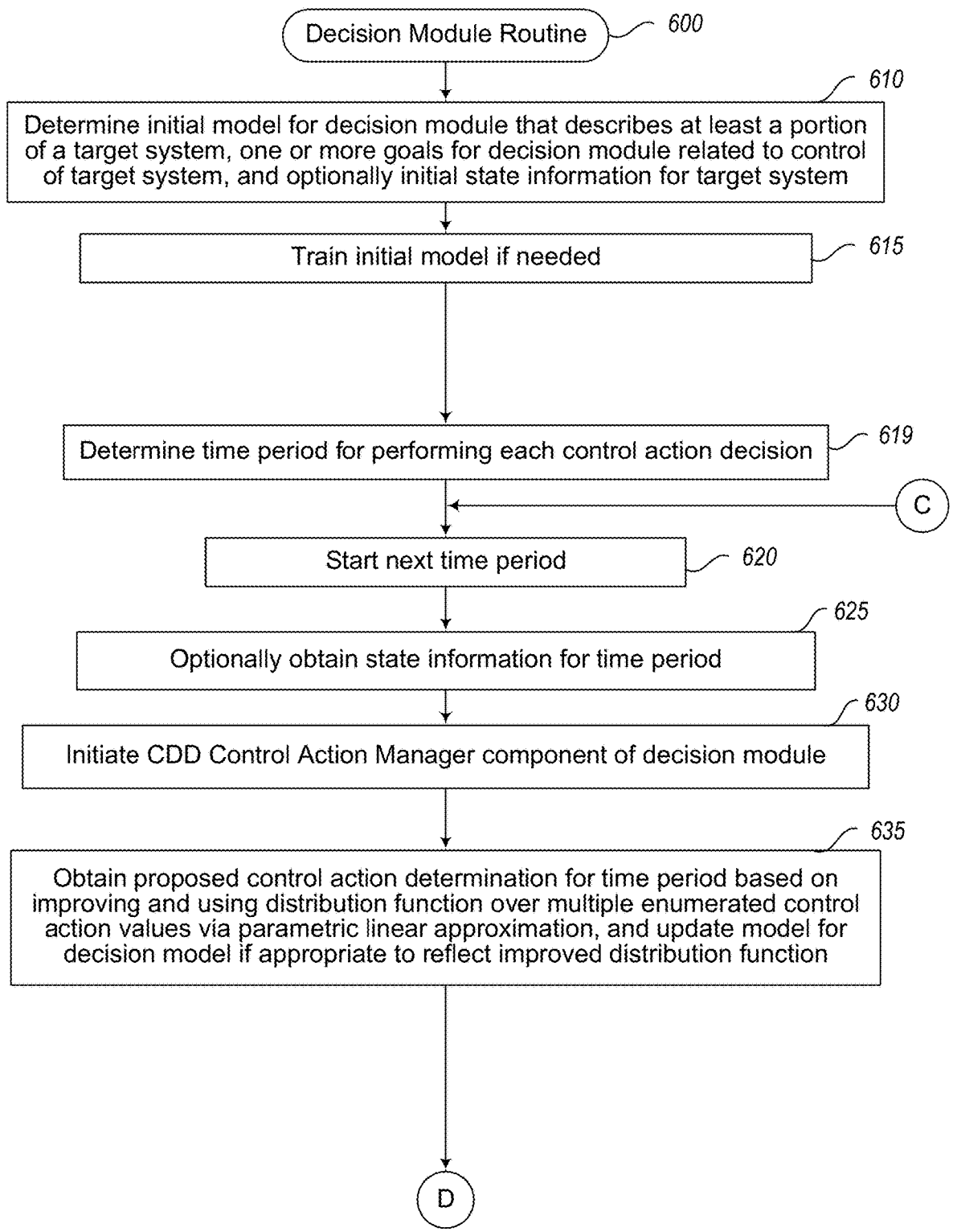
FIGS. 6A-6B illustrate a flow diagram of an example embodiment of a Decision Module routine.
Figure 6B:
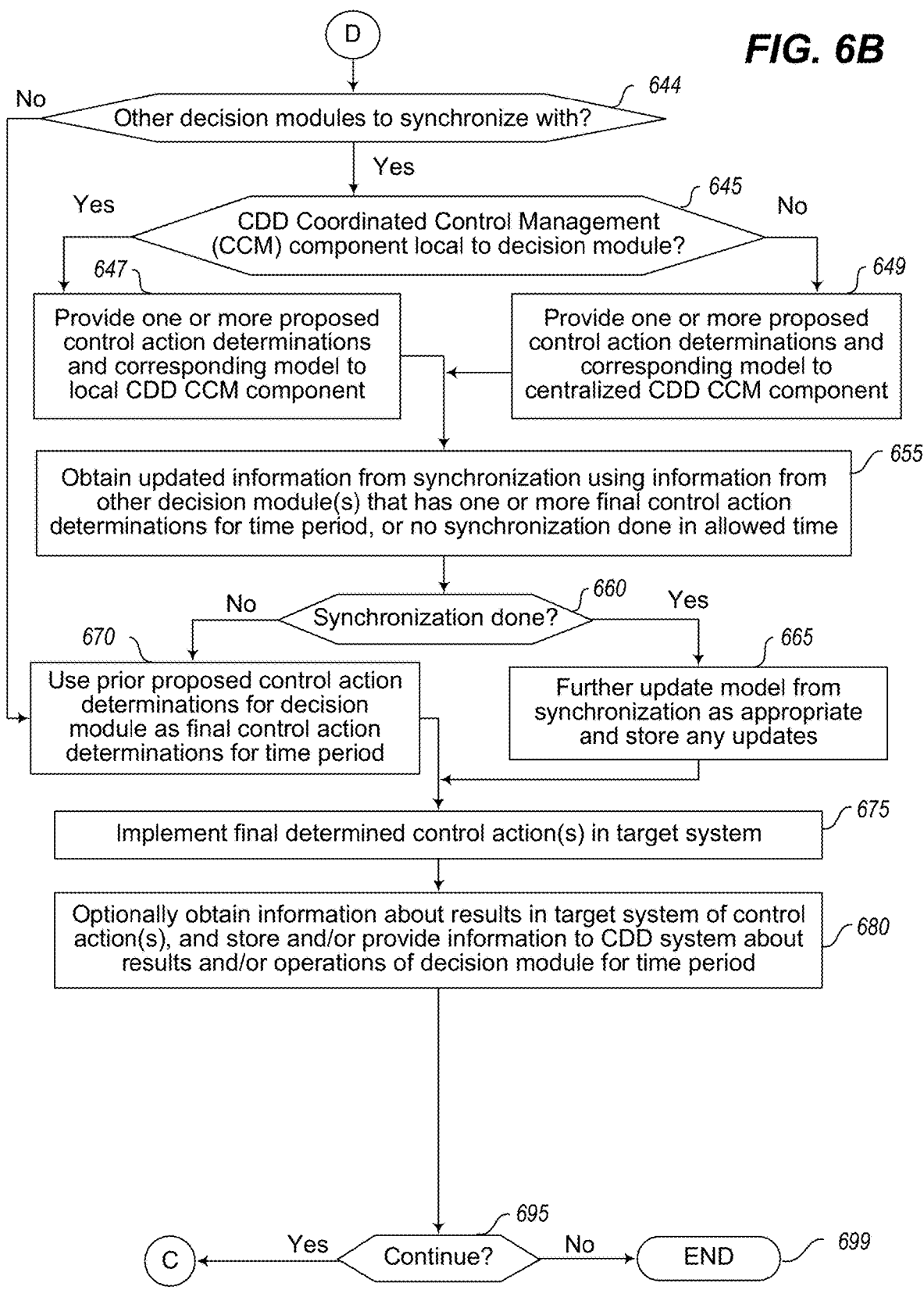

FIGS. 6A-6B illustrate a flow diagram of an example embodiment of a routine 600 corresponding to a generic representation of a decision module that is being executed. The routine may, for example, be provided by execution of a decision module 329 or as part of an automated control system 325 of FIG. 3, the automated control system 195*a* of FIG. 1A, the automated control system 205*a* of FIGS. 2A-2C, and/or a decision module 124 or 128 of FIG. 1B or 1C, such as to provide functionality for controlling at least a portion of a target system in a manner specific to information and a model encoded for the decision module, including to reflect one or more goals to be achieved by the decision module during its controlling activities. As discussed in greater detail elsewhere, in some embodiments and situations, multiple decision modules may collectively and cooperatively act to control a particular target system, such as with each decision module controlling one or more distinct control elements for the target system or otherwise representing or interacting with a portion of the target system, while in other embodiments and situations a single decision module may act alone to control a target system. The routine 600 further reflects actions performed by a particular example decision module when it is deployed in controlling a portion of a target system, although execution of at least portions of a decision module may occur at other times, such as initially to train a model for the decision module before the decision module is deployed, as discussed in greater detail with respect to the CDD Decision Module Construction routine 500 of FIGS. 5A-5B.

The illustrated embodiment of the routine 600 begins at block 610, where an initial model for the decision module is determined that describes at least a portion of a target system to be controlled, one or more goals for the decision module to attempt to achieve related to control of the target system, and optionally initial state information for the target system. The routine continues to block 615 to perform one or more actions to train the initial model if needed, as discussed in greater detail with respect to blocks 553 and 555 of FIGS. 5A-5B—in some embodiments and situations, such training for block 615 is performed only if initial training is not done by the routine 500 of FIGS. 5A-5B, while in other embodiments and situations the training of block 615 is performed to capture information about a current state of the target system at a time that the decision module begins to execute (e.g., if not immediately deployed after initial creation and training) and/or to re-train the model at times as discussed in greater detail with respect to routine 700 of FIG. 7 as initiated by block 630.

After block 615, the routine continues to block 619 to determine a time period to use for performing each control action decision for the decision module, such as to reflect a rate at which control element modifications in the target system are needed and/or to reflect a rate at which new incoming state information is received that may alter future manipulations of the control elements. The routine then continues to block 620 to start the next time period, beginning with a first time period moving forward from the startup of the execution of the decision module. Blocks 620-680 are then performed in a control loop for each such time period going forward until execution of the decision module is suspended or terminated, although in other embodiments a particular decision module may execute for only a single time period each time that it is executed.

In block 625, the routine optionally obtains state information for the time period, such as current state information that has been received from the target system (e.g., via one or more passive sensors) or one or more related external sources since the last time period began, and/or by actively retrieving current values of one or more elements of the target system or corresponding variables as needed. In block 630, the routine then initiates execution of a local CDD Control Action Manager component of the decision module, with one example of such a routine discussed in greater detail with respect to routine 700 of FIG. 7. In block 635, the results of the execution of the component in block 630 are received, including to obtain one or more proposed control action determinations that the decision module may perform for the current time period, and to optionally receive information about an improved distribution function used to determine the proposed control action(s) that may be used to update the model for the decision module (e.g., in embodiments in which the model stores information about the distribution function in use).

After block 635, the routine continues to block 644 to determine if other decision modules are collectively controlling portions of the current target system, such as part of the same automated control system as the local decision module, and if so continues to block 645. Otherwise, the routine continues to block 670 to select the local proposed control actions of the decision module as a final determined control action to perform, and then continues to block 675 to implement those control actions for the current time period.

If there are other operating decision modules, the routine in block 645 determines if the local decision module includes a local copy of a CDD Coordinated Control Management (CCM) component for use in synchronizing the proposed control action determinations for the decision module's local solutions with activities of other decision modules that are collectively controlling the same target system. If so, the routine continues to block 647 to provide the one or more proposed control action determinations of the decision module and the corresponding current local model for the decision module to the local CDD CCM component, and otherwise continues to block 649 to provide the one or more proposed control action determinations for the decision module and the corresponding local model of the decision module to one or more centralized CDD CCM components.

After blocks 647 or 649, the routine continues to block 655 to obtain results of the actions of the CDD CCM component(s) in blocks 647 or 649, including to either obtain one or more final control action determinations to perform for the time period for the current decision module that result from synchronization of the local model for the current decision module with information from one or more other decision modules, such as from a further updated consensus shared model resulting from the synchronization, or an indication that no such synchronization was completed in the allowed time. The routine continues to block 660 to determine whether the synchronization was completed, and if so continues to block 665 to store information about a further updated model from the synchronization if appropriate (e.g., to include information about an updated improved distribution function for a composite control space for all of the decision modules that is generated during the synchronization), and otherwise continues to block 670 to use the prior proposed control action determinations locally to the decision module as the final control action determinations for the time period.

After blocks 665 or 670, the routine continues to block 675 to implement the one or more final determined control actions for the decision module in the target system, such as by interacting with one or more effectuators or other actuators in the target system that regulate one or more control elements of the target system (e.g., modify input and/or output values of, or otherwise manipulate them), or by otherwise providing input to the target system to cause such modifications or other manipulations to occur. In block 680, the routine optionally obtains information about the results in the target system of the control actions performed, and stores and/or provides information to the CDD system about such obtained results and/or about the activities of the decision module for the current time period. After block 680, the routine continues to block 695 to determine whether to continue, such as until an indication to terminate or suspend operations is received (e.g., to reflect an end to current operation of the target system or an end of use of the decision module to control at least a portion of the target system). If it is determined to continue, the routine returns to block 620 to start the next time period, and otherwise continues to block 699 and ends.

FIG. 7 is a flow diagram of an example embodiment of a CDD Control Action Manager routine 700. The routine may, for example, be provided by execution of component 344 of FIG. 3 and/or components 144a-n or 184 of FIG. 1C and/or component 205c of FIGS. 2A-2C and/or other components executed as part of control systems or decision modules as described herein, such as to determine control actions for a decision module to propose and/or implement for a target system during a particular time period, such as by using parametric linear approximation to determine a control action using one of multiple enumerated possible values of an available control space that best satisfies one or more defined goals at a given time in light of current state information. While the illustrated embodiment of the routine is performed in a manner local to a particular decision module, such that some or all decision modules may each implement a local version of such a routine, in other embodiments the routine may be implemented in a centralized manner by one or more components with which one or more decision modules interact over one or more networks, such as with a particular decision module indicated to be used at a particular time rather than acting on behalf of the local decision module.

The illustrated embodiment of the routine 700 begins at block 703, where information or a request is received. The routine continues to block 705 to determine a type of the information or request, and to proceed accordingly. In particular, if a request is received in block 703 to determine a control action using a determined one of multiple enumerated possible control values for a current time period given a current model of the local decision module, the routine continues to block 710 to begin to perform such activities, as discussed in greater detail with respect to block 710-785. Otherwise, the routine continues instead to block 790 to perform one or more other indicated operations as appropriate, and to then proceed to block 799. Such other indicated operations may include, for example, receiving information about current models and/or control actions proposed or performed by one or more other decision modules that are collectively controlling a target system with the local decision module (such as for use in synchronizing the model of the local decision module with such other decision modules by generating a consensus or converged shared model, as discussed in greater detail with respect to routine 800 of FIGS. 8A-8B), to receive updates to a model or underlying information for the model for use in ongoing operation of the routine 700 (e.g., from a CDD Decision Module Construction component, etc.), to receive current state information for the target system, such as for use as discussed in routine 600 of FIGS. 6A-6B, etc.

If it determined in block 705 that a request for a determined control action to implement was received in block 703 for a current time period and based on a current model of the local decision module, the routine continues to block 710 to receive a current set of coupled differential equations that represent the current model for the local decision module of at least a portion of the target system, optionally along with additional state information for the target system for the current time. The routine then continues to block 715 to determine or otherwise obtain an indication of an interval time window size over which to determine the control action to implement, and then performs a loop of blocks 720-750 during that time window to improve a distribution function for the control space that will be used to determine the control action. In particular, the routine in block 720 solves a parametric linear approximation of the non-linear control space to determine an improved distribution function over multiple enumerated possible control values with respect to the one or more defined goals, and in block 730 then propagates the improved distribution function over later time window periods to determine corresponding results (e.g., by using a current model of the battery to predict future effects of particular further control actions). In block 740, one or more error values are then determined (e.g., for the propagated state information and/or for a degree of optimization from the propagating), and a determination is made in block 750 if the error value(s) are above one or more defined error tolerance thresholds and if time remains in the time window for an additional iteration of blocks 720-740. If so, the routine returns to block 720 to begin the next such iteration, and otherwise continues to block 760 use the improved distribution function from block 720 in the last iteration to determine the control action to implement for the target system for the time period (e.g., the 'best' control action that produces results according to the improved distribution function that satisfy the defined goals better than other possible control action). The routine further provides an indication of the corresponding proposed control action to implement in block 760, and after blocks 760 or 780, continues to block 799 and ends (e.g., to return to block 630 of routine 600 if the current execution of routine 700 was initiated there). It will be appreciated that if the routine 700 was instead implemented as a centralized routine that supports one or more decision modules remote from the executing component for the routine, the routine 700 may instead return to block 703 to await further information or requests.

Figure 8A:
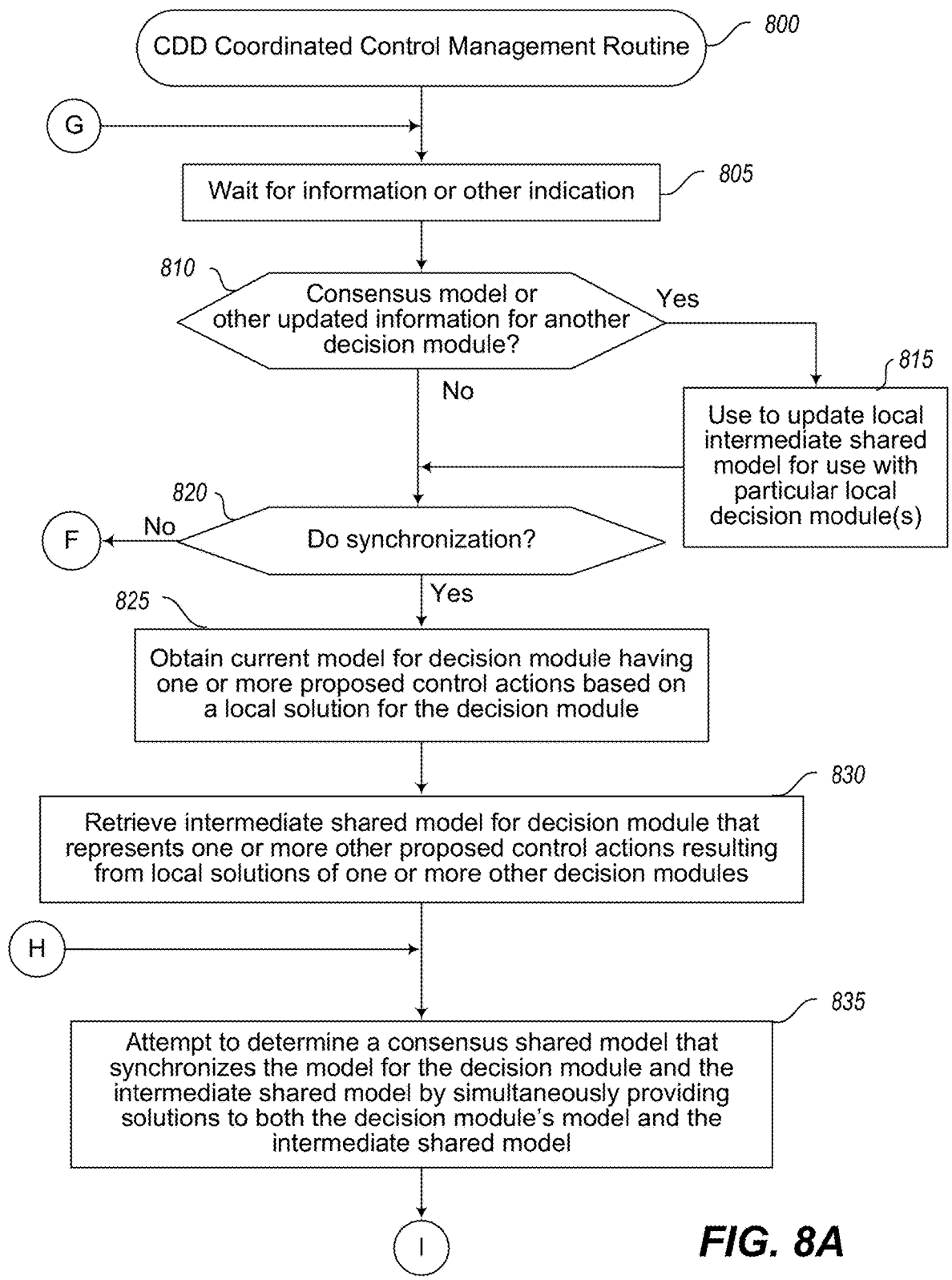

FIGS. 8A-8B are a flow diagram of an example embodiment of a CDD Coordinated Control Management routine 800. The routine may, for example, be provided by execution of the component 346 of FIG. 3 and/or the components 146a-n of FIG. 1C, such as to attempt to synchronize current models and their proposed control actions from current distribution functions of those models between multiple decision modules that are collectively controlling a target system. In the illustrated embodiment of the routine, the synchronization is performed in a pairwise manner between a particular local decision module's local current model and an intermediate shared model for that decision module that is based on information about the current state of one or more other decision modules, by using a Pareto game technique to determine a Pareto equilibrium if possible that is represented in a consensus shared model (e.g., having a consensus shared distribution function), although in other embodiments other types of synchronization methods may be used. In addition, in the illustrated embodiment, the routine 800 is performed in a local manner for a particular local decision module, such as by being included within that local decision module, although in other embodiments the routine 800 may be implemented in a centralized manner to support one or more decision modules that are remote from a computing system implementing the component for the routine and that communicate with those decision modules over one or more computer networks, such as with a particular decision module indicated to be used at a particular time rather than acting on behalf of the local decision module.

The illustrated embodiment of the routine 800 begins at block 805, where it waits to receive information or another indication. The routine continues to block 810 to determine if a consensus model or other updated information for another decision module has been received, such as from a copy of the routine 800 executing for that other decision module, and if so continues to block 815 to use the received information to update local intermediate shared model information for use with the local decision module on whose behalf the current copy of the routine 800 is executing, as discussed in greater detail with respect to block 830. If it is instead determined in block 810 that the information or request received in block 805 is not information related to one or more other decision modules, or after block 815, the routine continues to block 820 to determine whether to currently perform a synchronization for the current local model of the local decision module by using information about an intermediate shared model of the local decision module that includes information for one or more other decision modules, such as to do such synchronization each time that an update to the local decision module's model is received (e.g., based on operation of the routine 700 for a copy of the CDD Control Action Manager component local to that decision module) in block 805 and/or each time that information to update the local decision module's intermediate shared model is received in block 805 and used in block 815, or instead as explicitly indicated in block 805—if the synchronization is to currently be performed, the routine continues to block 825 and begins to perform blocks 825-880 related to such synchronization activities. Otherwise, the routine continues to block 885 to perform one or more other indicated operations as appropriate, such as to receive requests from the CDD system or other requestor for current information about operation of the routine 800 and/or to provide corresponding information to one or more entities (e.g., to reflect prior requests), etc.

If it is determined in block 820 that synchronization is to be currently performed, such as based on updated model-related information that is received in block 805, the routine continues to block 825 to obtain a current local model for the local decision module to use in the synchronizing, with the model including one or more proposed control actions to perform for a current time period based on a local distribution function for the local decision module. The routine then continues to block 830 to retrieve information for an intermediate shared model of the local decision module that represents information for one or more other decision modules (e.g., all other decision modules) that are collectively participating in controlling the target system, with that intermediate shared model similarly representing one or more other proposed control actions resulting from local distribution functions of those one or more other decision modules, optionally after partial or complete synchronization has been performed for those one or more other decision modules between themselves.

The routine then continues to block 835 to attempt to determine a consensus shared model (e.g., with a consensus shared distribution function) that synchronizes the current model of the local decision module and the intermediate shared model by simultaneously providing solutions to both the local decision module's current model and the intermediate shared model (e.g., via a consensus shared distribution function that incorporates the respective distribution functions of the local decision module's current model and the intermediate shared model). As discussed in greater detail elsewhere, in some embodiments, the local current model and intermediate shared model may each be represented by a Hamiltonian function to enable a straightforward creation of such a combined model in an additive manner for the respective Hamiltonian functions, with the operations of routines 600 and/or 700 of FIGS. 6A-6B and 7, respectively, similarly representing the models that they update and otherwise manipulate using such Hamiltonian functions.

After block 835, the routine continues to block 840 to determine whether the operations of block 835 succeeded in an allowed amount of time, such as a fraction or other portion of the current time period for which the synchronization is attempted to be performed, and if so the routine continues to block 845 to update both the local model and the intermediate shared model of the local decision module to reflect the consensus shared model. As earlier noted, if sufficient time is allowed for each decision module to repeatedly determine a consensus shared model with changing intermediate shared models representing one or more other decision modules of a collective group, the decision modules of the collective group may eventually converge on a single converged shared model, although in other embodiments and situations there may not be sufficient time for such convergence to occur, or other issues may prevent such convergence. After block 845, the routine continues to block 850 to optionally notify other decision modules of the consensus shared model determined for the local decision module (and/or of a converged shared model, if the operations of 835 were a last step in creating such a converged shared model), such as if each of the notified decision modules is implementing its own local version of the routine 800 and the provided information will be used as part of an intermediate shared model of those other decision modules that includes information from the current local decision module's newly constructed consensus shared model.

If it is instead determined in block 840 that a synchronization did not occur in the allowed time, the routine continues to perform blocks 860-875 to re-attempt the synchronization with one or more modifications, sometimes repeatedly if sufficient time is available. In the illustrated example, the routine determines in block 860 if additional time is available for one or more such re-attempts at synchronization, and if not the routine continues to block 880 to provide an indication that no synchronization was performed within the allowed time. Otherwise, the routine continues to block 870 to determine whether to take one or more actions to perform one or more of relaxing rules or other restrictions, repairing rules or other restrictions, and/or re-training a model, with respect to one or both of the current model of the local decision module and/or one or more other decision modules whose information is represented in the intermediate shared model of the local decision module. If it is determined in block 870 to proceed in this manner, the routine continues to block 875 to perform corresponding actions, sometimes one at a time, including to cause resulting updates to the current model of the local decision module and/or to the local intermediate shared model of the local decision module, after which the routine returns to block 835 to re-attempt to synchronize the local model and the intermediate shared model of the local decision module.

If it is instead determined in block 870 that no further actions are to be performed with respect to relaxation, repair and/or re-training, the routine continues instead to block 880. After blocks 850, 880 or 885, the routine continues to block 895 to determine whether to continue, such as until an explicit indication to terminate or suspend operation of the routine 800 is received, such as to reflect an end to operation of the target system and/or an end to use of the local decision module and/or a collective group of multiple decision modules to control the target system. If it is determined to continue, the routine returns to block 805, and otherwise continues to block 899 and ends.

Figure 9:
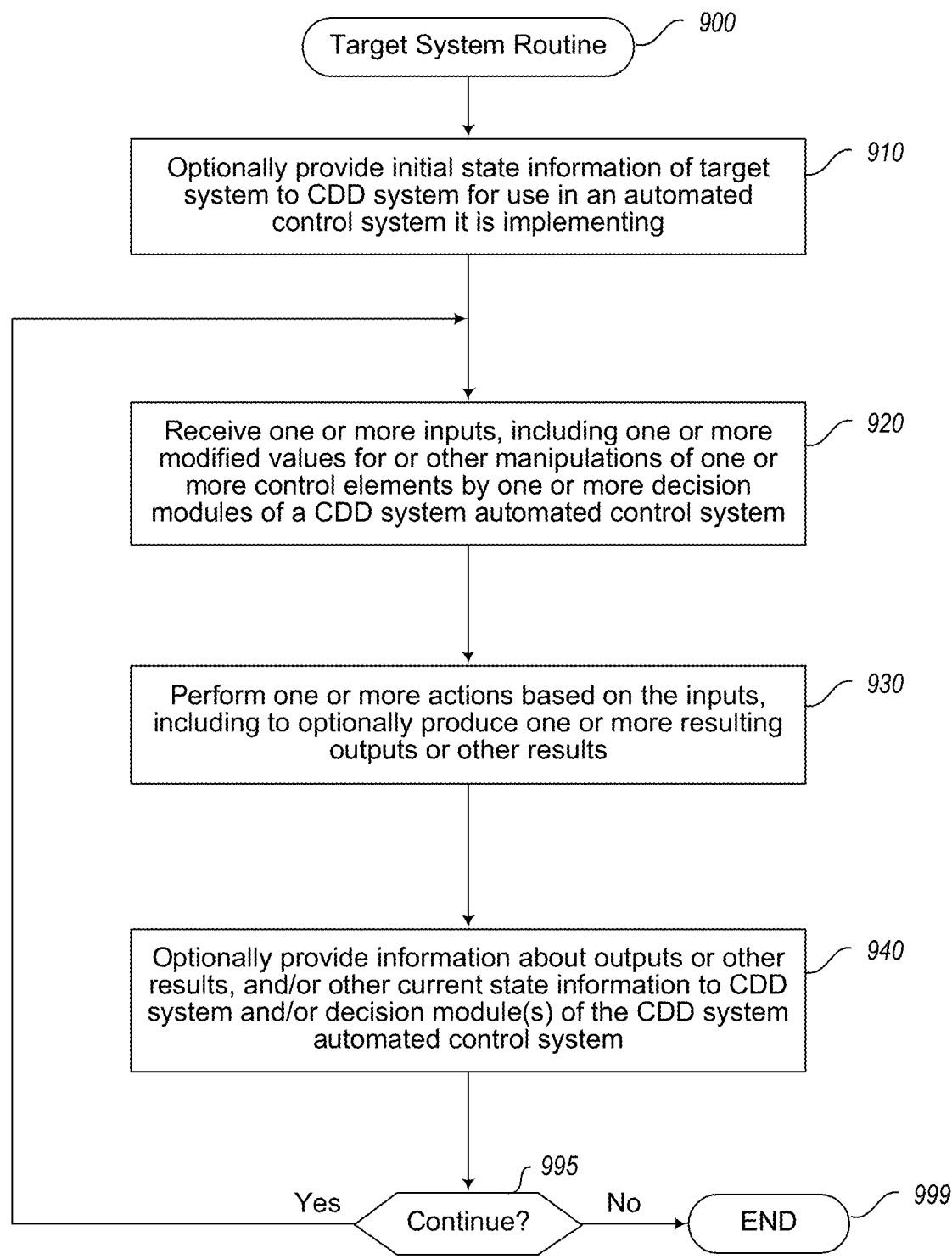
FIG. 9 illustrates a flow diagram of an example embodiment of a routine for a target system being controlled.

FIG. 9 illustrates a flow diagram of an example embodiment of a routine 900 performed for a representative generic target system, with respect to interactions between the target system and one or more decision modules that are controlling at least a portion of the target system. The routine may, for example, be provided by execution of a target system 360 and/or 370 of FIG. 3, an electrical device 195*b* of FIG. 1A, a battery 205*b* discussed with respect to FIGS. 2A-2C, and/or a target system 160 and/or 170 of FIGS. 1B and 1C, such as to implement operations specific to the target system. It will be appreciated that the illustrated embodiment of the routine focuses on interactions of the target system with the one or more decision modules, and that many or all such target systems will perform many other operations in a manner specific to those target systems that are not illustrated here for the purpose of brevity.

The routine begins at block 910, where it optionally provides initial state information for the target system to a CDD system for use in an automated control system of the CDD system for the target system, such as in response to a request from the CDD system or its automated control system for the target system, or instead based on configuration specific to the target system (e.g., to be performed upon startup of the target system). After block 910, the routine continues to perform a loop of blocks 920-940 to control ongoing operations of the target system. As discussed in greater detail elsewhere, the blocks 920, 930, 940 may be repeatedly performed for each of multiple time periods, which may vary greatly in time depending on the target system (e.g., a microsecond, a millisecond, a hundredth of a second, a tenth of a second, a second, 2 seconds, 5 seconds, 10 seconds, 15 seconds, 30 seconds, a minute, 5 minutes, 10 minutes, 15 minutes, 30 minutes, an hour, etc.).

In particular, the routine in block 920 receives one or more inputs from a collective group of one or more decision modules that implement the automated control system for the target system, including one or more modified values for or other manipulations of one or more control elements of a plurality of elements of the target system that are performed by one or more such decision modules of the automated control system. After block 920, the routine continues to block 930 to perform one or more actions in the target system based on the inputs received, including to optionally produce one or more resulting outputs or other results within the target system based on the manipulations of the control elements. In block 940, the routine then optionally provides information about the outputs or other results within the target system and/or provides other current state information for the target system to the automated control system of the CDD system and/or to particular decision modules of the automated control system, such as to be obtained and measured or otherwise analyzed via passive sensors and/or active sensors.

The routine then continues to block 995 to determine whether to continue, such as until an explicit indication to terminate or suspend operation of the target system is received. If it is determined to continue, the routine returns to block 920 to begin a next set of control actions for a next time period, and otherwise continues to block 999 and ends. As discussed in greater detail elsewhere, state information that is provided to a particular decision module may include requests from external systems to the target system, which the automated control system and its decision modules may determine how to respond to in one or more manners. In addition, while the control action manager component in the illustrated embodiment makes modifications directly to control system actuators within the target system (rather than providing modification information to the target system for it to use to attempt to make such modifications, in a manner analogous to blocks 920 and 930), in other embodiments the routine 900 may receive and act on such control system actuator modification requests.

It will be appreciated that the functionality provided by the routines discussed above may be provided in alternative ways in some embodiments, such as being split among more routines or consolidated into fewer routines. Similarly, illustrated routines may in some embodiments provide more or less functionality than is described, such as when other illustrated routines instead lack or include such functionality respectively, or when the amount of functionality provided is altered. Also, while various operations may be illustrated as being performed in a particular manner (e.g., in serial or parallel, synchronously or asynchronously, etc.) and/or in a particular order, those skilled in the art will appreciate that the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described for purposes of illustration, modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form (e.g., while some aspects of the invention may not be recited as being embodied in a computer-readable medium or as part of a system, other aspects may likewise be so embodied), and with any combination of claim elements in different claims that are not logically inconsistent.

What is claimed is:

1. A computer-implemented method comprising:

obtaining, by one or more computing systems of a collaborative distributed decision system, a model representing a physical system having a battery and having an additional electrical power source and having an impedance actuator with a plurality of impedance levels that modify respective electrical power output levels of the battery, wherein the additional electrical power source is used to provide electrical power to satisfy a level of electrical power demand if a current electrical power output level of the battery is less than the level of the electrical power demand, and wherein the model is based at least in part on a goal to maximize battery life while satisfying the electrical power demand and on binary rules that represent operating principles of the battery and that are used to reach true or false values from evaluating state information for the battery; and controlling, by the one or more configured computing systems, ongoing operations of the physical system that involve supplying electrical power from the battery by, for each of multiple successive time periods:

performing, by the one or more configured computing systems and using the model, a parametric linear approximation for the time period to determine one of the impedance levels that provides higher satisfaction of the goal than other of the impedance levels, including implementing multiple iterations that each involve (a) solving a linear approximation of a non-linear control space for the operations of the physical system to improve a distribution function over multiple enumerated values of the control space with respect to the goal and (b) propagating the improved distribution function over later time periods using predictions based on the model, with the multiple iterations continuing until errors for the state information and for a degree of optimization from the propagating are below defined tolerance thresholds or until an end of an iteration time window for the time period;

implementing, by the one or more configured computing systems, a control action for the time period that includes providing the determined one impedance level on the impedance actuator to cause the battery to produce the respective electrical power output level for the determined one impedance level; and updating, by the one or more configured computing systems, state information in the model using further state information gathered for the battery from one or more sensors.

2. The computer-implemented method of claim 1 wherein the ongoing operations of the physical system further involve supplying electrical power to the battery to be stored for later use in electrical power output from the battery, and wherein the method further comprises determining and implementing further control actions at further time periods to cause electrical power to be supplied to the battery for storage during the further time periods, including further determining and using one of the plurality of impedance levels at each of the further time periods.

3. The computer-implemented method of claim 1 further comprising determining and implementing further control actions at further time periods to prevent a requested amount of electrical power to be supplied from the battery during the further time periods, to cause the additional electrical power source to provide at least some of the requested amount of electrical power during the further time periods.

4. The computer-implemented method of claim 1 wherein the controlling of the ongoing operations for each of the multiple successive time periods further includes determining an amount of electrical power to supply from the battery for the time period, and wherein determining of the one impedance level for each time period is further based in part on the determined amount of electrical power to supply from the battery for the time period.

5. The computer-implemented method of claim 1 wherein the physical system includes an electrical vehicle and further includes one or more controls that modify movement of the electrical vehicle, and wherein, for one or more of the multiple successive time periods, the controlling of the ongoing operations further involves determining the control action for the time period to include adjusting movement of the vehicle in accordance with the determined one impedance level for the time period, and the implementing of the control action for the time period includes initiating the adjusted movement of the electrical vehicle via use of the one or more controls.

6. The computer-implemented method of claim 1 wherein the physical system includes an electricity generating facility that stores generated electricity in the battery and further includes one or more controls for supplying electricity to the battery, and wherein, for one or more of the multiple successive time periods, the controlling of the ongoing operations further involves determining the control action for the time period to include supplying electricity to the battery in accordance with the determined one impedance level for the time period, and the implementing of the control action for the time period includes initiating the supplying of the electricity via use of the one or more controls.

7. The computer-implemented method of claim 1 wherein the updating of the state information in the model includes gathering the further state information from multiple sensors measuring characteristics of the battery during the ongoing operations that include an external temperature of the battery and include amperes and volts for the electrical output level from the battery.

8. The computer-implemented method of claim 1 wherein the model includes a total Hamiltonian function that is based on the binary rules and on historical data from previous operations of the physical system, wherein the binary rules include one or more absolute rules that specify non-modifiable restrictions that are requirements regarding the ongoing operations of the physical system and further include one or more hard rules that specify restrictions regarding the ongoing operations of the physical system that can be modified in specified situations, and wherein the total Hamiltonian function is further based in part on one or more soft rules that each specifies one or more additional conditions to be evaluated to reach one of multiple possible values other than true or false with an associated likelihood.

9. The computer-implemented method of claim 1 wherein the physical system includes one or more super capacitor elements that store and/or supply electricity and further includes one or more controls for supplying electricity to and/or from the one or more super capacitor elements according to indicated criteria, and wherein, for one or more of the multiple successive time periods, the controlling of the ongoing operations further involves determining the control action for the time period to include supplying electricity to or from the one or more super capacitor elements in accordance with the determined one impedance level for the time period, and the implementing of the control action for the time period includes initiating the supplying of the electricity to or from the one or more super capacitor elements via use of the one or more controls.

10. The computer-implemented method of claim 9 wherein determining to supply electricity to or from the one or more super capacitor elements for the one or more time periods is performed based at least in part on a change in rate of supply and/or demand during the one or more time periods exceeding a defined threshold.

11. A non-transitory computer-readable medium having stored contents that, when implemented, cause one or more computing systems to perform automated operations, the automated operations comprising:

receiving, by the one or more computing systems, a model that represents a battery and is based at least in part on state information for the battery and on a goal that includes maximizing battery life while satisfying electrical power demand from the battery; and controlling, by the one or more computing systems, battery operations for a time period by performing a parametric linear approximation using the model to determine one of multiple control values to implement for the time period for an actuator associated with the battery that provides higher satisfaction of the goal than other of the control values, including:

for each of multiple iterations for the time period, solving a linear approximation of a non-linear control space for the battery operations to improve a distribution function over multiple enumerated values of the control space with respect to the goal, and propagating the improved distribution function over later time periods, wherein the multiple iterations continue until one or more errors for a current iteration of the multiple iterations are below one or more defined tolerance thresholds, the one or more errors for the current iteration being associated with at least one of the state information or a degree of optimization from the propagating for the current iteration; and implementing the determined one control value for the actuator, to cause the battery to provide or receive electrical power in accordance with the determined one control value.

12. The non-transitory computer-readable medium of claim 11 wherein the multiple control values for the actuator include multiple selectable impedance levels for an impedance element in series with the battery, wherein determining of the one control value for the actuator includes selecting one of the multiple selectable impedance levels, and wherein the implementing of the determined one selectable control values for the actuator includes causing the actuator to use the selected one impedance level for the impedance element.

13. The non-transitory computer-readable medium of claim 11 wherein the stored contents include executable software instructions that, when executed by at least one of the one or more computing systems, further cause the one or more computing systems to perform the controlling of the battery operations for each of multiple successive time periods and to update the model for each time period based on further state information gathered for the battery from one or more sensors and on the implemented determined one control value for the time period, such that the distribution function is further improved for each of the multiple successive time periods.

14. The non-transitory computer-readable medium of claim 11 wherein the solving of the linear approximation and the propagating of the improved distribution function for each of the multiple iterations further includes determining, for the current iteration of the multiple iterations, the one or more errors associated with the at least one of the state information or the degree of optimization from the propagating for the current iteration.

15. The non-transitory computer-readable medium of claim 11 wherein the battery is part of a physical system further having one or more outputs and having one or more controls that are manipulatable to modify at least one output and having multiple sensors to passively measure the state information for the battery, and wherein the model further includes binary rules that evaluate to true or false values and that use operating principles of the battery as part of evaluating the state information.

16. The non-transitory computer-readable medium of claim 15 wherein the model includes a total Hamiltonian function that is based at least in part on the binary rules and on historical data from previous use of the battery, wherein the binary rules include one or more absolute rules that specify non-modifiable restrictions that are requirements regarding the battery operations and further include one or more hard rules that specify restrictions regarding the battery operations that can be modified in specified situations and further include one or more soft rules that each specifies one or more additional conditions to be evaluated to reach one of multiple possible values other than true or false with an associated likelihood.

17. A system comprising:
one or more hardware processors of one or more computing systems; and
one or more memories storing instructions that, when executed by at least one of the one or more hardware processors, cause the one or more computing systems to perform automated operations, the automated operations comprising:
receiving, by the one or more computing systems, a model that represents a battery and is based at least in part on state information for the battery and on a goal that includes maximizing battery life while satisfying electrical power demand from the battery; and
controlling, by the one or more computing systems, battery operations for a time period by performing a parametric linear approximation using the model to determine one of multiple control values to implement for the time period for an actuator associated with the battery that provides higher satisfaction of the goal than other of the control values, including:
for each of multiple iterations for the time period, solving a linear approximation of a non-linear control space for the battery operations to improve a distribution function over multiple enumerated values of the control space with respect to the goal, and propagating the improved distribution function over later time periods, wherein the multiple iterations continue until one or more errors for a current iteration of the multiple iterations are below one or more defined tolerance thresholds, the one or more errors for the current iteration being associated with at least one of the state information or a degree of optimization from the propagating for the current iteration; and
implementing the determined one control value for the actuator, to cause the battery to provide or receive electrical power in accordance with the determined one control value.

18. The system of claim 17 wherein the multiple control values for the actuator include multiple selectable impedance levels for an impedance element in series with the battery, wherein determining of the one control value for the actuator includes selecting one of the multiple selectable impedance levels, and wherein the implementing of the determined one selectable control values for the actuator includes causing the actuator to use the selected one impedance level for the impedance element.

19. The system of claim 17 wherein the stored instructions include executable software instructions that, when executed by at least one of the one or more computing systems, further cause the one or more computing systems to perform the controlling of the battery operations for each of multiple further successive time periods and to update the model for each time period based on further state information gathered for the battery from one or more sensors and on the implemented determined one control value for the time period, such that the distribution function is further improved for each of the multiple further successive time periods, and wherein the multiple iterations for each of the multiple further successive time periods continue until at least one of a time window expires for that further successive time period or one or more errors for a current iteration of the multiple iterations are below one or more defined tolerance thresholds.

20. The system of claim 17 wherein the solving of the linear approximation and the propagating of the improved distribution function for each of the multiple iterations further includes determining, for the current iteration of the multiple iterations, the one or more errors associated with the at least one of the state information or the degree of optimization from the propagating for the current iteration.

21. The system of claim 17 wherein the battery is part of a physical system further having one or more outputs and having one or more controls that are manipulatable to modify at least one output and having multiple sensors to passively measure the state information for the battery, and wherein the model further includes binary rules that evaluate to true or false values and that use operating principles of the battery as part of evaluating the state information.

22. The system of claim 21 wherein the model includes a total Hamiltonian function that is based at least in part on the binary rules and on historical data from previous use of the battery, wherein the binary rules include one or more absolute rules that specify non-modifiable restrictions that are requirements regarding the battery operations and further include one or more hard rules that specify restrictions regarding the battery operations that can be modified in specified situations and further include one or more soft rules that each specifies one or more additional conditions to be evaluated to reach one of multiple possible values other than true or false with an associated likelihood.

* * * * *